United States Patent
Shan

(10) Patent No.: US 12,238,639 B2
(45) Date of Patent: Feb. 25, 2025

(54) ENABLING FIFTH-GENERATION PROXIMITY SERVICES IN FIFTH-GENERATION SYSTEMS

(71) Applicant: Intel Corporation, Santa Clara, CA (US)

(72) Inventor: Changhong Shan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 233 days.

(21) Appl. No.: 17/642,911

(22) PCT Filed: Dec. 22, 2020

(86) PCT No.: PCT/US2020/066713
§ 371 (c)(1),
(2) Date: Mar. 14, 2022

(87) PCT Pub. No.: WO2021/138166
PCT Pub. Date: Jul. 8, 2021

(65) Prior Publication Data
US 2022/0330138 A1 Oct. 13, 2022

(30) Foreign Application Priority Data
Dec. 31, 2019 (WO) ................ PCT/CN2019/130398

(51) Int. Cl.
*H04W 48/16* (2009.01)
*H04W 4/021* (2018.01)
*H04W 4/029* (2018.01)
*H04W 8/18* (2009.01)
*H04W 8/24* (2009.01)
*H04W 12/08* (2021.01)
*H04W 28/02* (2009.01)
(Continued)

(52) U.S. Cl.
CPC .......... *H04W 48/16* (2013.01); *H04W 4/021* (2013.01); *H04W 4/029* (2018.02); *H04W 8/18* (2013.01); *H04W 8/24* (2013.01); *H04W 12/08* (2013.01); *H04W 28/0268* (2013.01); *H04W 84/042* (2013.01); *H04W 92/18* (2013.01)

(58) Field of Classification Search
CPC ..... H04W 48/16; H04W 4/029; H04W 4/021; H04W 8/18; H04W 8/24; H04W 12/08; H04W 28/0268; H04W 84/042; H04W 92/18
USPC ........................................ 370/329
See application file for complete search history.

(56) References Cited

U.S. PATENT DOCUMENTS

2018/0206089 A1 7/2018 Cavalcanti et al.
2019/0037448 A1 1/2019 Shan et al.
(Continued)

FOREIGN PATENT DOCUMENTS

CN 110463231 A 11/2019

OTHER PUBLICATIONS 62931131P (Year: 2019).*
(Continued)

*Primary Examiner* — Intekhaab A Siddiquee
(74) *Attorney, Agent, or Firm* — Schwabe, Williamson & Wyatt, P.C.

(57) ABSTRACT

Systems, apparatuses, methods, and computer-readable media are provided for authorizing fifth generation (5G) proximity services (ProSe) for fifth-generation systems (5GS). Other embodiments may be described and/or claimed.

20 Claims, 10 Drawing Sheets

(51) Int. Cl.
*H04W 84/04* (2009.01)
*H04W 92/18* (2009.01)

(56) References Cited

U.S. PATENT DOCUMENTS

2019/0306754 A1 10/2019 Shan et al.
2019/0313359 A1 10/2019 Lee et al.
2021/0136570 A1* 5/2021 Paladugu ................ H04L 67/51

OTHER PUBLICATIONS

3GPP TS 23.287 V16.1.0 (Year: 2019).*
International Patent Office—International Search Report and Written Opinion mailed Mar. 26, 2021, from International Application No. PCT/US2020/066713, 10 pages.
Lg Electronics et al., "TS 23.287 No signalling connection release after registration procedure," SA WG2 Meeting #134, S2-1907464, Agenda Item: 6.6.1, Jun. 24-28, 2019, Sapporo, Japan, 4 pages.
Nokia et al., "Correction to V2X Policy update due to UE PLMN change," SA WG2 Meeting #135, S2-1909301, Change Request 23.287 CR 0025 rev—Current version: 16.0.0, Oct. 14-18, 2019, Split, HR, 2 pages.
Nokia et al., "Update to delivery of PC5 QoS parameters to NG-RAN," SA WG2 Meeting #135, S2-1910778, Change Request 23.287 CR 0024 rev 3 Current version: 16.0.0, Oct. 14-18, 2019, Split, HR, 3 pages.
Qualcomm Incorporated et al., "Plan for ProSe 5G," SA WG2 Meeting #135, S2-1909585, Agenda Item: 8.6, Oct. 14-18, 2019, Split, Croatia, 56 pages.
Indian Patent Office- Office Action mailed Jan. 31, 2023 from Indian Patent Application No. 202247015886, 8 pages.
GSMA, "Unlocking Commercial Opportunities From 4G Evolution to 5G," GSMA Network 2020, Published Feb. 2016, London, United Kingdom, Link: https://www.gsma.com/futurenetworks/wpcontent/uploads/2017/03/704_GSMA_unlocking_comm_opp_report_v5.pdf, 55 pages.
3GPP, "Technical Specification Group Services and System Aspects; Study on system enhancement for Proximity based Services (ProSe) in the 5G System (5GS) (Release 17)," 3GPP TR 23.752 V0.2.0 (Dec. 2019), 5G, 35 pages.
3GPP, "Technical Specification Group Services and System Aspects; Architecture enhancements for 5G System (5GS) to support Vehicle-to-Everything (V2X) services (Release 16)," 3GPP TS 23.287 V16.1.0 (Dec. 2019), 5G, 51 pages.
3GPP, "Technical Specification Group Services and System Aspects; Procedures for the 5G System (5GS); Stage 2 (Release 16)," 3GPP TS 23.502 V16.3.0 (Dec. 2019), 5G, 558 pages.
3GPP, "Technical Specification Group Services and System Aspects; Policy and charging control framework for the 5G System (5GS); Stage 2 (Release 16)," 3GPP TS 23.503 V16.3.0 (Dec. 2019), 5G, 112 pages.
3GPP, "Technical Specification Group Services and System Aspects; Proximity-based services (ProSe); Stage 2 (Release 15)," 3GPP TS 23.303 V15.1.0 (Jun. 2018), Ltd Advanced Pro, 130 pages.
European Patent Office- Extended European Search Report mailed Jan. 15, 2024, from EP Patent Application No. 20910065.0, 15 pages.
Interdigital, Inc., "Solution for KI #3: Support of UE-to-Network Relay," SA WG2 Meeting #136, S2-1911798, Agenda Item: 8.6, Nov. 18-22, 2019, Reno, US, 5 pages.
Chinese Patent Office- Office Action mailed Sep. 19, 2024, from Chinese Patent Application No. 202080083443.5, 8 pages.

* cited by examiner

100

Retrieving, from memory, PC5 capability information associated with a PC5 capability for fifth generation (5G) proximity services (ProSe) for a user equipment (UE)
105

Selecting, based on the PC5 capability information, a policy control function (PCF) that supports 5G ProSe information provisioning
110

Establishing a UE policy association with the selected PCF for 5G ProSe information provisioning delivery
115

Receiving a registration request message from a user equipment (UE) that includes PC5 capability information associated with a PC5 capability for fifth generation (5G) proximity services (ProSe) for the UE
205

Selecting, based on the PC5 capability information, a policy control function (PCF) that supports 5G ProSe information provisioning
210

Establishing a UE policy association with the selected PCF for 5G ProSe information provisioning delivery
215

FIG. 2

300 

```
┌─────────────────────────────────────────────────────────────────────────┐
│ Receiving, from an access and mobility management function (AMF),       │
│ information associated with a PC5 capability for fifth generation (5G)  │
│ proximity services (ProSe) for a user equipment (UE)                    │
│                                 305                                     │
└─────────────────────────────────────────────────────────────────────────┘
                                    │
                                    ▼
┌─────────────────────────────────────────────────────────────────────────┐
│ Determining, based on the PC5 capability information, to provision a    │
│ 5G ProSe policy and parameter                                           │
│                                 310                                     │
└─────────────────────────────────────────────────────────────────────────┘
                                    │
                                    ▼
┌─────────────────────────────────────────────────────────────────────────┐
│ Encoding a message for transmission to the UE that includes an          │
│ indication of the 5G ProSe policy and parameter                         │
│                                 315                                     │
└─────────────────────────────────────────────────────────────────────────┘
```

FIG. 3

ENABLING FIFTH-GENERATION PROXIMITY SERVICES IN FIFTH-GENERATION SYSTEMS

RELATED APPLICATIONS

The present application is a national phase entry under 35 U.S.C. § 371 of International Application No. PCT/US2020/066713, filed Dec. 22, 2020, entitled "ENABLING FIFTH-GENERATION PROXIMITY SERVICES IN FIFTH-GENERATION SYSTEMS," which claims priority to Patent Cooperation Treaty Application No. PCT/CN2019/130398 filed Dec. 31, 2019 (AC7269-PCT-Z).

FIELD

Various embodiments generally may relate to the field of wireless communications. In particular, some embodiments are directed to authorizing fifth generation (5G) proximity services (ProSe) for fifth-generation systems (5GS).

BACKGROUND

A Third Generation Partnership Project (3GPP) Release (Rel) 17 SA2 included a study item on 5G proximity services (ProSe). In association with the study item, 3GPP Technical Report (TR) 23.752 identified a key issue regarding support of PC5 service authorization and policy/parameter provisioning.

BRIEF DESCRIPTION OF THE FIGURES

FIGS. 1 and 2, and 3 illustrate examples of operation flow/algorithmic structures in accordance with some embodiments.

DETAILED DESCRIPTION

Figure 4:
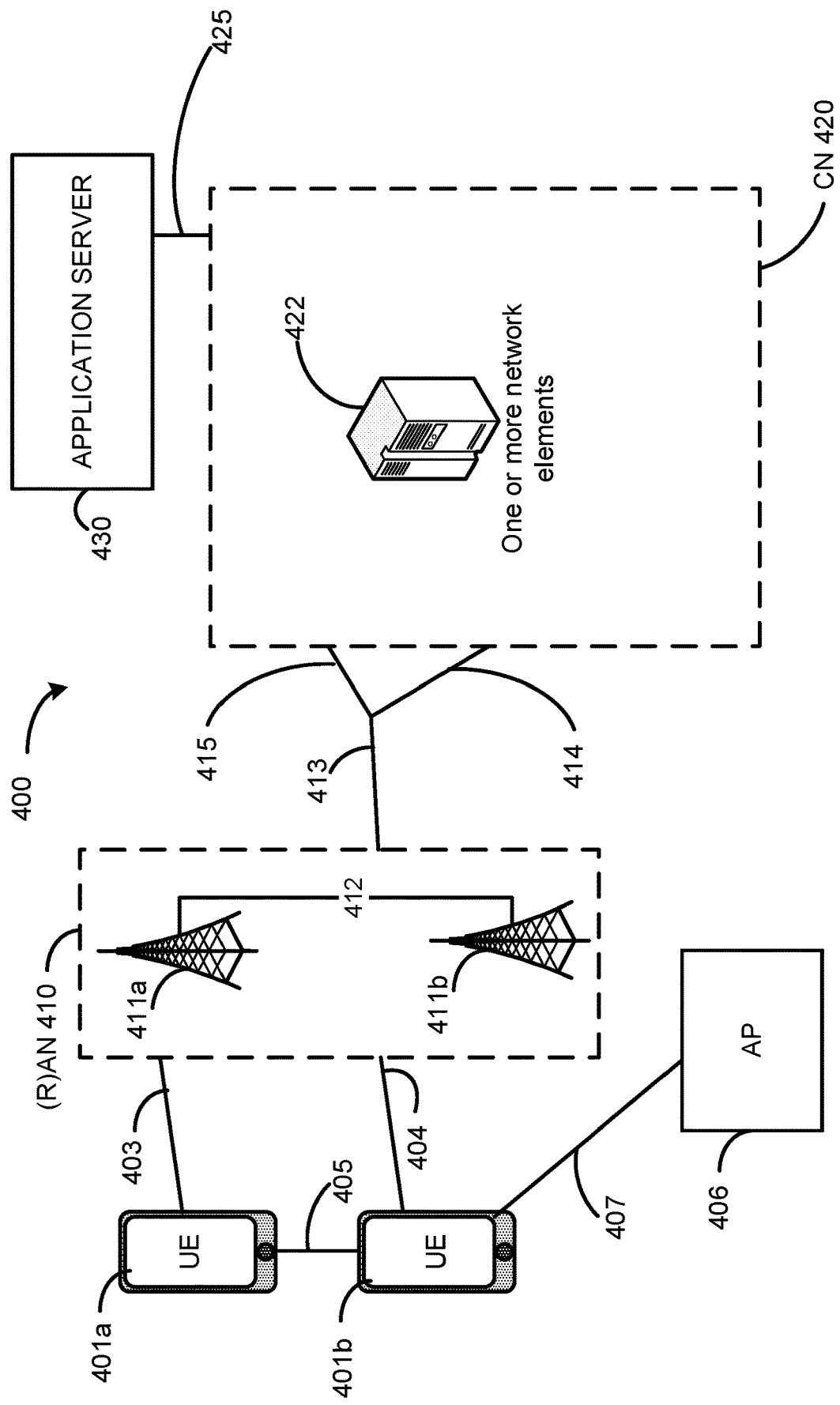
FIG. 4 depicts an architecture of a system of a network in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

In the 3GPP Rel 17 SA2 study item FS_5G_ProSe, following key issue is identified in Technical Report (TR) 23.752:

Key Issue #8: Support of PC5 Service Authorization and Policy/Parameter Provisioning:

In order to enable PC5 service authorization and policy/parameter provisioning following aspects need to be studied:

For the procedures related to PC5 service authorization and policy/parameter provisioning to a UE, only necessary enhancement with what is specified in TS 23.287 [5] clause 6.2 and TS 23.502 [8] clause 4.2.2.2 (Registration Procedure), 4.2.4.3 (UE Configuration Update procedure for transparent UE Policy Delivery), 4.16.11 (UE Policy Association Establishment procedure), 4.16.12 (UE Policy Association Modification procedure), will be documented.

Identify necessary information for PC5 service authorization and provisioning based on what is specified in TS 23.287 [5] clause 5.1.2.1.

Authorisation and Provisioning as documented in TS 23.287 [5] clause 5.1 will be used as baseline for this key issue.

How to authorize the 5G ProSe service in 5GS needs to be studied.

Among other things, embodiments of this disclosure describe solutions to identify the policy and parameters for authorizing UE to use ProSe service in 5GS, which may include one or more of the following aspects:

(1) Enable ProSe policy and parameters provisioning to a UE from a policy control function (PCF);

(2) Enable network scheduled mode operation for long-term evolution (LTE) and/or new radio (NR) PC5 in next generation radio access network (NG-RAN) systems;

(3) Policy and parameter for ProSe Direct Discovery and communication.

5.1.1 Authorization for a 5G ProSe UE

According to the aforementioned key issue description, PCF based service authorization and provisioning as defined in eV2XARC Technical Specification (TS) 23.287 will be used as baseline. References to TSs below refer to 3GPP specifications.

5.1.1.1 Enhancement to ProSe Service Authorization and Provisioning Procedure 5.1.1.1.1 Information Provisioning to UE For PCF based Service Authorization and Provisioning to 5G ProSe UE, the Registration procedures as defined in clause 4.2.2.2 of TS 23.502, UE Policy Association Establishment procedure as defined in clause 4.16.11 of TS 23.502 and UE Policy Association Modification procedure as defined in clause 4.16.12 of TS 23.502 apply with the following additions:

If the UE indicates its PC5 capability for 5G ProSe with according RAT indication in the Registration Request message and if the UE is authorized for 5G ProSe service, the access and mobility management function (AMF) selects the PCF which supports 5G ProSe information provisioning and establishes a UE policy association with the PCF for 5G ProSe information provisioning delivery.

If the AMF receives the PC5 capability for 5G ProSe with according RAT indication in the Registration Request message from UE, the AMF further reports the PC5 capability for 5G ProSe with according RAT indication to the selected PCF. The PCF determines the 5G ProSe Policy and parameters based on the received PC5 capability for 5G ProSe with according RAT indication.

If the UE supports PC5 capability for 5G ProSe and it does not have valid 5G ProSe authorization information, the UE includes the UE Policy Container with indicating the 5G ProSe Policy and parameter Provisioning request during registration procedure.

If the UE indicates the 5G ProSe Policy and parameter Provisioning request in the UE Policy Container, the PCF determines whether to provision the 5G ProSe Policy and parameter to the UE, as specified in clause 6.1.2.2.2 of TS 23.503, and the PCF provides the 5G ProSe Policy and parameters to the UE by using the procedure as defined in clause 4.2.4.3 "UE Configuration Update procedure for transparent UE Policy Delivery" in TS 23.502.

The PCF may update the 5G ProSe Policy and parameters to the UE in one or more of the following conditions:

UE Mobility, e.g. UE moves from one public land mobile network (PLMN) to another PLMN. This is achieved by using the procedure of UE Policy Association Modification initiated by the AMF, as defined in clause 4.16.12.1 of TS 23.502.

When there is a subscription change in the list of PLMNs where the UE is authorized to perform the 5G operation. This is achieved by using UE Policy Association Modification initiated by the PCF procedure as defined in clause 4.16.12.2 of TS 23.502.

When there is a change of service specific parameter as described in clause 4.15.6.7 of TS 23.502.

If the serving PLMN is removed from the list of PLMNs in the service authorization parameters, the service authorization is revoked in the UE.

When the UE is roaming, the change of subscription resulting in updates of the service authorization parameters are transferred to the UE by H-PCF via V-PCF.

The UE may perform UE triggered Policy Provisioning procedure to the PCF as specified in clause 6.2.4 of TS 23.287 when the UE determines the 5G ProSe Policy and parameters are invalid (e.g. Policy/Parameter is outdated, missing or invalid).

5.1.1.1.2 Information Provisioning to NG-RAN for Network Scheduled Mode Operation The Registration procedure for UE is performed as defined in TS 23.502 with the following additions:

The UE includes the PC5 Capability for ProSe (e.g. LTE PC5 only, NR PC5 only, both LTE and NR PC5) as part of the "5GMM capability" in the Registration Request message. The AMF stores this information for ProSe operation. The PC5 Capability for ProSe indicates whether the UE is capable of supporting ProSe Direct Discovery and communication over PC5 reference point and which specific PC5 radio access technology (RAT)(s) it supports.

The AMF determines whether the UE is authorized to use ProSe Direct Discovery and communication over PC5 reference point based on UE's PC5 Capability for V2X and the subscription data (e.g. "ProSe services authorized" indication and UE-PC5-AMBR per PC5 RAT, and cross-RAT PC5 control authorization if applicable) received from UDM, and stores the subscription data as part of the UE context.

The PCF provides the PC5 QoS parameters to AMF. The AMF stores such information as part of the UE context.

If the UE is PC5 capable for ProSe, and the UE is authorized to use ProSe Direct Communication over PC5 reference point based on the subscription data, then the AMF shall include in the NG application protocol (NGAP) message sent to a next-generation radio access network (NG-RAN):

a "ProSe services authorized" indication, indicating the UE is authorized to use ProSe Direct Discovery and communication over PC5 reference point.

UE-PC5-AMBR per PC5 RAT and cross-RAT PC5 control authorization if applicable, used by NG-RAN for the resource management of UE's PC5 transmission for ProSe services in network scheduled mode.

the PC5 QoS parameters used by the NG-RAN for the resource management of UE's PC5 transmission for ProSe services in network scheduled mode.

5.1.1.2 The Policy/parameter for ProSe Direct Communication

The following sets of information for ProSe Direct Communications over PC5 reference point is provisioned to the UE:

1) Authorization Policy:

When the UE is "served by Evolved Universal Terrestrial Radio Access (E-UTRA)" or "served by NR":

PLMNs in which the UE is authorized to perform 5G ProSe Direct Communications over PC5 reference point when "served by E-UTRA" or "served by NR".

For each above PLMN:

RAT(s) over which the UE is authorized to perform ProSe Direct Communications over PC5 reference point.

When the UE is "not served by E-UTRA" and "not served by NR":

Indicates whether the UE is authorized to perform ProSe Direct Communications over PC5 reference point when "not served by E-UTRA" and "not served by NR".

RAT(s) over which the UE is authorized to perform ProSe Direct Communications over PC5 reference point.

2) Radio parameters when the UE is "not served by E-UTRA" and "not served by NR":

Includes the radio parameters per PC5 RAT (e.g. LTE PC5, NR PC5) with Geographical Area(s) and an indication of whether they are "operator managed" or "non-operator managed". The UE uses the radio parameters to perform ProSe Direct Communications over PC5 reference point when "not served by E-UTRA" and "not served by NR" only if the UE can reliably locate itself in the corresponding Geographical Area. Otherwise, the UE is not authorized to transmit.

NOTE 1: Whether a frequency band is "operator managed" or "non-operator managed" in a given Geographical Area is defined by local regulations.

3) Policy/parameters per RAT for PC5 Tx Profile selection:

The mapping of ProSe service to Tx Profile.

4) Policy/parameters related to privacy:

The list of ProSe service with Geographical Area(s) that require privacy support.

5) Policy/parameters when LTE PC5 is selected:

Same as specified in TS 23.303 clause 4.5.1.1.2.3, 4.5.1.1.2.3.3, 4.5.1.1.2.3.3a.

6) Policy/parameters when NR PC5 is selected:

The mapping of ProSe service to radio frequencies with Geographical Area(s).

The mapping of Destination Layer-2 ID(s) and the ProSe service for broadcast.

The mapping of Destination Layer-2 ID(s) and the ProSe service for groupcast.

The mapping of default Destination Layer-2 ID(s) for initial signaling to establish unicast connection and the ProSe service.

NOTE 2: The same default Destination Layer-2 ID for unicast initial signaling can be mapped to more than one ProSe service. In the case where different V2X services are mapped to distinct default Destination Layer-2 IDs, when the UE intends to establish a single unicast link that can be used for more than one V2X service types, the UE can select any of the default Destination Layer-2 IDs to use for the initial signaling.

PC5 QoS mapping configuration:
Input from ProSe application layer:
ProSe service.
(Optional) ProSe Application Requirements for the ProSe service, e.g. priority requirement, reliability requirement, delay requirement, range requirement.
Output:
PC5 QoS parameters defined in clause 5.4.2 of 23.287 (e.g. PQI and conditionally other parameters such as maximum flow bit rate/guaranteed flow bit rate (MFBR/GFBR), etc).
sidelink radio bearer (SLRB) configurations, e.g. the mapping of PC5 QoS profile(s) to SLRB(s), when the UE is "not served by E-UTRA" and "not served by NR".
The PC5 QoS profile contains PC5 QoS parameters described in clause 5.4.2 of 23.287, and value for the QoS characteristics regarding Priority Level, Averaging Window, Maximum Data Burst Volume if default value is not used as defined in Table 5.4.4-1 of 23.287.

7) Validity timer indicating the expiration time of the ProSe Policy/Parameter.

5.1.1.3 The Policy/parameter for ProSe Direct Discovery

The following sets of information for ProSe Direct Discovery over PC5 reference point is provisioned to the UE:

1) Authorization policy:
When the UE is "served by E-UTRA" or "served by NR":
For open ProSe Direct Discovery, applicable only to non-Public Safety UEs:
a) open ProSe Direct Discovery Model A monitoring authorisation policy:
PLMNs in which the UE is authorised to perform ProSe Direct Discovery monitoring.
b) open ProSe Direct Discovery Model A announcing authorisation policy:
PLMNs in which the UE is authorized to perform announcing.
Authorised discovery range for announcing per PLMN.
For restricted ProSe Direct Discovery:
a) restricted ProSe Direct Discovery Model A monitoring authorisation policy:
PLMNs in which the UE is authorised to perform restricted ProSe Direct Discovery Model A monitoring.
b) restricted ProSe Direct Discovery Model A announcing authorisation policy:
PLMNs in which the UE is authorized to perform restricted ProSe Direct Discovery Model A announcing;
Authorised discovery range for announcing per PLMN.
c) restricted ProSe Direct Discovery Model B Discoverer operation authorization policy:
PLMNs in which the UE is authorized to perform Model B Discoverer operation;
Authorised discovery range for announcing per PLMN.

d) restricted ProSe Direct Discovery Model B Discoveree operation authorization policy:
PLMNs in which the UE is authorized to perform Model B Discoveree operation.
Authorised discovery range for announcing per PLMN.
For each above PLMN:
RAT(s) over which the UE is authorized to perform ProSe Direct Communications over PC5 reference point.
When the UE is "not served by E-UTRA" and "not served by NR":
Indicates whether the UE is authorised to perform ProSe Direct Discovery for Model A and Model B when "not served by NG-RAN".
RAT(s) over which the UE is authorized to perform ProSe Direct Discovery over PC5 reference point.

2) Radio parameters when the UE is "not served by E-UTRA" and "not served by NR":
Includes the radio parameters per PC5 RAT (e.g. LTE PC5, NR PC5) with Geographical Area(s) and an indication of whether they are "operator managed" or "non-operator managed". The UE uses the radio parameters to perform ProSe Direct Discovery over PC5 reference point when "not served by E-UTRA" and "not served by NR" only if the UE can reliably locate itself in the corresponding Geographical Area. Otherwise, the UE is not authorized to transmit.

NOTE 4: Whether a frequency band is "operator managed" or "non-operator managed" in a given Geographical Area is defined by local regulations.

3) restricted ProSe Direct Discovery UE ID for Restricted Direct Discovery, applicable only to non-Public Safety UEs:
ProSe Direct Discovery UE ID.

4) Group Member Discovery parameters:
For each discovery group that the UE belongs to include the following parameters that enable the UE to perform Group Member Discovery when provisioned in ME from PCF or configured in UICC:
Application Layer Group ID: Identifies an application layer group that the UE belongs to.
User Info ID: For Model A, this corresponds to the Announcer Info parameter when the UE is acting as an announcing UE. For Model B, this corresponds to the Discoverer Info in Solicitation messages and the Discoveree Info in Response messages, when the UE is acting as a discoverer or discoveree UE respectively.
NOTE 5: User Info ID is expected to be assigned uniquely to a user within the discovery group.
Discovery Group ID: identifier of a discovery group that the UE belongs to.

Systems and Implementations

FIG. 4 illustrates an example architecture of a system 400 of a network, in accordance with various embodiments. The following description is provided for an example system 400 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 4, the system 400 includes UE 401*a* and UE 401*b* (collectively referred to as "UEs 401" or "UE 401"). In this example, UEs 401 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 401 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 401 may be configured to connect, for example, communicatively couple, with an or RAN 410. In embodiments, the RAN 410 may be an NG RAN or a 5G RAN, an E-UTRAN, or a legacy RAN, such as a UTRAN or GERAN. As used herein, the term "NG RAN" or the like may refer to a RAN 410 that operates in an NR or 5G system 400, and the term "E-UTRAN" or the like may refer to a RAN 410 that operates in an LTE or 4G system 400. The UEs 401 utilize connections (or channels) 403 and 404, respectively, each of which comprises a physical communications interface or layer (discussed in further detail below).

In this example, the connections 403 and 404 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 401 may directly exchange communication data via a ProSe interface 405. The ProSe interface 405 may alternatively be referred to as a SL interface 405 and may comprise one or more logical channels, including but not limited to a PSCCH, a PSSCH, a PSDCH, and a PSBCH.

The UE 401b is shown to be configured to access an AP 406 (also referred to as "WLAN node 406," "WLAN 406," "WLAN Termination 406," "WT 406" or the like) via connection 407. The connection 407 can comprise a local wireless connection, such as a connection consistent with any IEEE 802.11 protocol, wherein the AP 406 would comprise a wireless fidelity (Wi-Fi®) router. In this example, the AP 406 is shown to be connected to the Internet without connecting to the core network of the wireless system (described in further detail below). In various embodiments, the UE 401b, RAN 410, and AP 406 may be configured to utilize LWA operation and/or LWIP operation. The LWA operation may involve the UE 401b in RRC_CONNECTED being configured by a RAN node 411a-b to utilize radio resources of LTE and WLAN. LWIP operation may involve the UE 401b using WLAN radio resources (e.g., connection 407) via IPsec protocol tunneling to authenticate and encrypt packets (e.g., IP packets) sent over the connection 407. IPsec tunneling may include encapsulating the entirety of original IP packets and adding a new packet header, thereby protecting the original header of the IP packets.

The RAN 410 can include one or more AN nodes or RAN nodes 411a and 411b (collectively referred to as "RAN nodes 411" or "RAN node 411") that enable the connections 403 and 404. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 411 that operates in an NR or 5G system 400 (for example, a gNB), and the term "E-UTRAN node" or the like may refer to a RAN node 411 that operates in an LTE or 4G system 400 (e.g., an eNB). According to various embodiments, the RAN nodes 411 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 411 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 411; a MAC/PHY split wherein RRC, PDCP, RLC, and MAC layers are operated by the CRAN/vBBUP and the PHY layer is operated by individual RAN nodes 411; or a "lower PHY" split wherein RRC, PDCP, RLC, MAC layers and upper portions of the PHY layer are operated by the CRAN/vBBUP and lower portions of the PHY layer are operated by individual RAN nodes 411. This virtualized framework allows the freed-up processor cores of the RAN nodes 411 to perform other virtualized applications. In some implementations, an individual RAN node 411 may represent individual gNB-DUs that are connected to a gNB-CU via individual F1 interfaces (not shown by FIG. 4). In these implementations, the gNB-DUs may include one or more remote radio heads or RFEMs (see, e.g., FIG. 6A), and the gNB-CU may be operated by a server that is located in the RAN 410 (not shown) or by a server pool in a similar manner as the CRAN/vBBUP. Additionally or alternatively, one or more of the RAN nodes 411 may be next generation eNBs (ng-eNBs), which are RAN nodes that provide E-UTRA user plane and control plane protocol terminations toward the UEs 401, and are connected to a 5GC (e.g., CN 5220 of FIG. 5B) via an NG interface (discussed infra).

In V2X scenarios one or more of the RAN nodes 411 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 401 (vUEs 401). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 411 can terminate the air interface protocol and can be the first point of contact for the UEs 401. In some embodiments, any of the RAN nodes 411 can fulfill various logical functions for the RAN 410 including, but not limited to, radio network controller (RNC) functions such as radio bearer management, uplink and downlink dynamic radio resource management and data packet scheduling, and mobility management.

In embodiments, the UEs 401 can be configured to communicate using OFDM communication signals with each other or with any of the RAN nodes 411 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 411 to the UEs 401, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 401 and the RAN nodes 411 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 401 and the RAN nodes 411 may operate using LAA, eLAA, and/or feLAA mechanisms. In these implementations, the UEs 401 and the RAN nodes 411 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 401, RAN nodes 411 etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 401, AP 406, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (p); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 401 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 401. The PDCCH carries information about the transport format and resource allocations related to the PDSCH channel, among other things. It may also inform the UEs 401 about the transport format, resource allocation, and HARQ information related to the uplink shared channel Typically, downlink scheduling (assigning control and shared channel resource blocks to the UE 401b within a cell) may be performed at any of the RAN nodes 411 based on channel quality information fed back from any of the UEs 401. The downlink resource assignment information may be sent on the PDCCH used for (e.g., assigned to) each of the UEs 401.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 411 may be configured to communicate with one another via interface 412. In embodiments where the system 400 is an LTE system (e.g., when CN 420 is an EPC 5120 as in FIG. 5A), the interface 412 may be an X2 interface 412. The X2 interface may be defined between two or more RAN nodes 411 (e.g., two or more eNBs and the like) that connect to EPC 420, and/or between two eNBs connecting to EPC 420. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 401 from an SeNB for user data; information of PDCP PDUs that were not delivered to a UE 401; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 400 is a 5G or NR system (e.g., when CN 420 is an 5GC 5220 as in FIG. 5B), the interface 412 may be an Xn interface 412. The Xn interface is defined between two or more RAN nodes 411 (e.g., two or more gNBs and the like) that connect to 5GC 420, between a RAN node 411 (e.g., a gNB) connecting to 5GC 420 and an eNB, and/or between two eNBs connecting to 5GC 420. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 401 in a connected mode (e.g., CM-CONNECTED) including functionality to manage the UE mobility for connected mode between one or more RAN nodes 411. The mobility support may include context transfer from an old (source) serving RAN node 411 to new (target) serving RAN node 411; and control of user plane tunnels between old (source) serving RAN node 411 to new (target) serving RAN node 411. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 410 is shown to be communicatively coupled to a core network—in this embodiment, core network (CN) 420. The CN 420 may comprise a plurality of network elements 422, which are configured to offer various data and telecommunications services to customers/subscribers (e.g., users of UEs 401) who are connected to the CN 420 via the RAN 410. The components of the CN 420 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 420 may be referred to as a network slice, and a logical instantiation of a portion of the CN 420 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 430 may be an element offering applications that use IP bearer resources with the core network (e.g., UMTS PS domain, LTE PS data services, etc.). The application server 430 can also be configured to support one or more communication services (e.g., VoIP sessions, PTT sessions, group communication sessions, social networking services, etc.) for the UEs 401 via the EPC 420.

In embodiments, the CN 420 may be a 5GC (referred to as "5GC 420" or the like), and the RAN 410 may be connected with the CN 420 via an NG interface 413. In embodiments, the NG interface 413 may be split into two parts, an NG user plane (NG-U) interface 414, which carries traffic data between the RAN nodes 411 and a UPF, and the S1 control plane (NG-C) interface 415, which is a signaling interface between the RAN nodes 411 and AMFs. Embodiments where the CN 420 is a 5GC 420 are discussed in more detail with regard to FIG. 5B.

In embodiments, the CN 420 may be a 5G CN (referred to as "5GC 420" or the like), while in other embodiments, the CN 420 may be an EPC). Where CN 420 is an EPC (referred to as "EPC 420" or the like), the RAN 410 may be connected with the CN 420 via an S1 interface 413. In embodiments, the S1 interface 413 may be split into two parts, an S1 user plane (S1-U) interface 414, which carries traffic data between the RAN nodes 411 and the S-GW, and the S1-MME interface 415, which is a signaling interface between the RAN nodes 411 and MMEs. An example architecture wherein the CN 420 is an EPC 420 is shown by FIG. 5A.

Figure 5A:
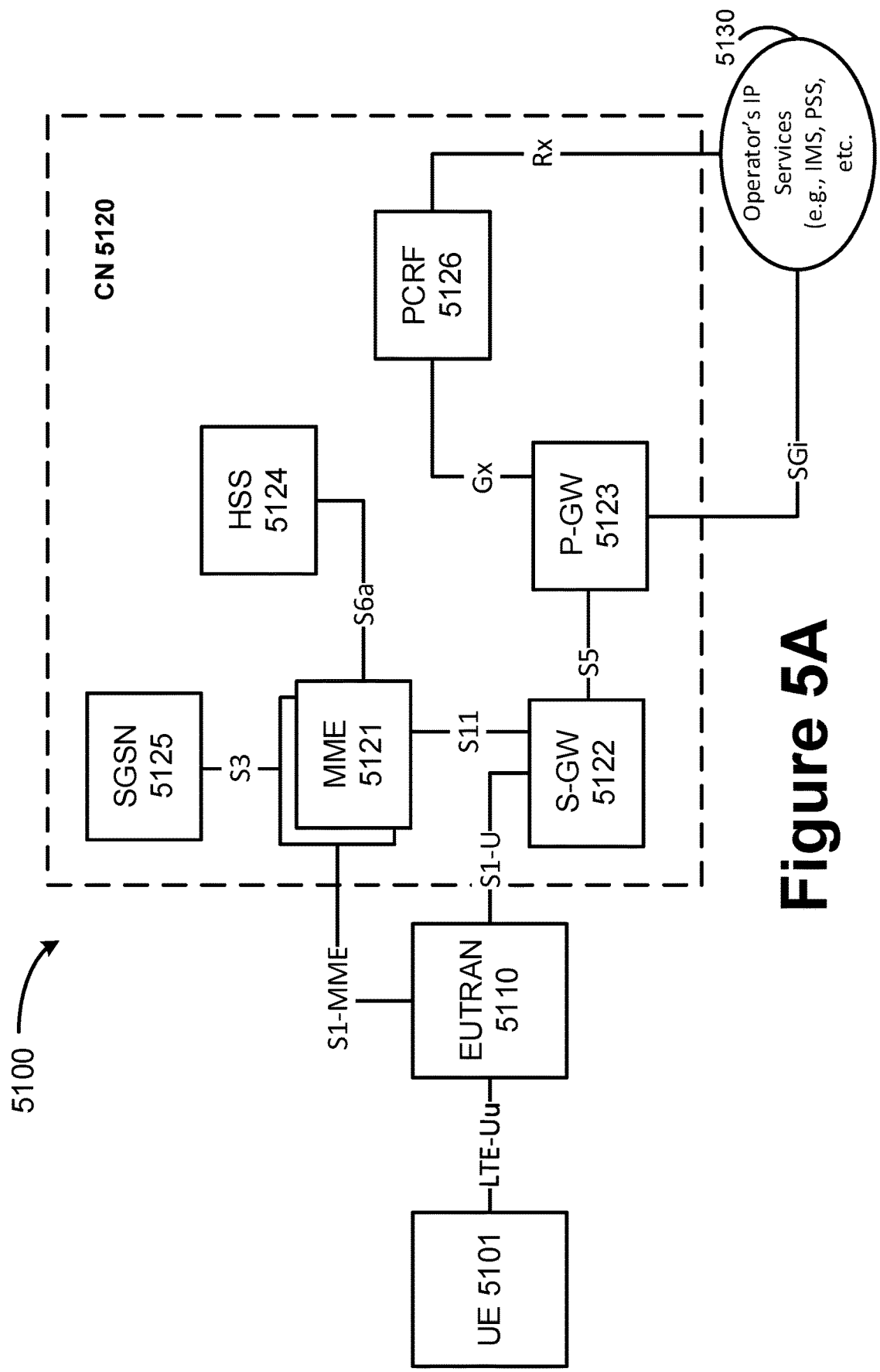
FIG. 5A depicts an architecture of a system including a first core network in accordance with some embodiments.

FIG. 5A illustrates an example architecture of a system 5100 including a first CN 5120, in accordance with various embodiments. In this example, system 5100 may implement the LTE standard wherein the CN 5120 is an EPC 5120 that corresponds with CN 420 of FIG. 4. Additionally, the UE 5101 may be the same or similar as the UEs 401 of FIG. 4, and the E-UTRAN 5110 may be a RAN that is the same or similar to the RAN 410 of FIG. 4, and which may include RAN nodes 411 discussed previously. The CN 5120 may comprise MMEs 5121, an S-GW 5122, a P-GW 5123, a HSS 5124, and a SGSN 5125.

The MMEs 5121 may be similar in function to the control plane of legacy SGSN, and may implement MM functions to keep track of the current location of a UE 5101. The MMEs 5121 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 5101, provide user identity confidentiality, and/or perform other like services to users/subscribers. Each UE 5101 and the MME 5121 may include an MM or EMM sublayer, and an MM context may be established in the UE 5101 and the MME 5121 when an attach procedure is successfully completed. The MM context may be a data structure or database object that stores MM-related information of the UE 5101. The MMEs 5121 may be coupled with the HSS 5124 via an S6a reference point, coupled with the SGSN 5125 via an S3 reference point, and coupled with the S-GW 5122 via an S11 reference point.

The SGSN 5125 may be a node that serves the UE 5101 by tracking the location of an individual UE 5101 and performing security functions. In addition, the SGSN 5125 may perform Inter-EPC node signaling for mobility between 2G/3G and E-UTRAN 3GPP access networks; PDN and S-GW selection as specified by the MMEs 5121; handling of UE 5101 time zone functions as specified by the MMEs 5121; and MME selection for handovers to E-UTRAN 3GPP access network. The S3 reference point between the MMEs 5121 and the SGSN 5125 may enable user and bearer information exchange for inter-3GPP access network mobility in idle and/or active states.

The HSS 5124 may comprise a database for network users, including subscription-related information to support the network entities' handling of communication sessions. The EPC 5120 may comprise one or several HSSs 5124, depending on the number of mobile subscribers, on the capacity of the equipment, on the organization of the network, etc. For example, the HSS 5124 can provide support for routing/roaming, authentication, authorization, naming/addressing resolution, location dependencies, etc. An S6a reference point between the HSS 5124 and the MMEs 5121 may enable transfer of subscription and authentication data for authenticating/authorizing user access to the EPC 5120 between HSS 5124 and the MMEs 5121.

The S-GW 5122 may terminate the S1 interface 413 ("S1-U" in FIG. 5A) toward the RAN 5110, and routes data packets between the RAN 5110 and the EPC 5120. In addition, the S-GW 5122 may be a local mobility anchor point for inter-RAN node handovers and also may provide an anchor for inter-3GPP mobility. Other responsibilities may include lawful intercept, charging, and some policy enforcement. The S11 reference point between the S-GW 5122 and the MMEs 5121 may provide a control plane between the MMEs 5121 and the S-GW 5122. The S-GW 5122 may be coupled with the P-GW 5123 via an S5 reference point.

The P-GW 5123 may terminate an SGi interface toward a PDN 5130. The P-GW 5123 may route data packets between the EPC 5120 and external networks such as a network including the application server 430 (alternatively referred to as an "AF") via an IP interface 425 (see e.g., FIG. 4). In embodiments, the P-GW 5123 may be communicatively coupled to an application server (application server 430 of FIG. 4 or PDN 5130 in FIG. 5A) via an IP communications interface 425 (see, e.g., FIG. 4). The S5 reference point between the P-GW 5123 and the S-GW 5122 may provide user plane tunneling and tunnel management between the P-GW 5123 and the S-GW 5122. The S5 reference point may also be used for S-GW 5122 relocation due to UE 5101 mobility and if the S-GW 5122 needs to connect to a non-collocated P-GW 5123 for the required PDN connectivity. The P-GW 5123 may further include a node for policy enforcement and charging data collection (e.g., PCEF (not shown)). Additionally, the SGi reference point between the P-GW 5123 and the packet data network (PDN) 5130 may be an operator external public, a private PDN, or an intra operator packet data network, for example, for provision of IMS services. The P-GW 5123 may be coupled with a PCRF 5126 via a Gx reference point.

PCRF 5126 is the policy and charging control element of the EPC 5120. In a non-roaming scenario, there may be a single PCRF 5126 in the Home Public Land Mobile Network (HPLMN) associated with a UE 5101's Internet Protocol Connectivity Access Network (IP-CAN) session. In a roaming scenario with local breakout of traffic, there may be two PCRFs associated with a UE 5101's IP-CAN session, a Home PCRF (H-PCRF) within an HPLMN and a Visited PCRF (V-PCRF) within a Visited Public Land Mobile Network (VPLMN). The PCRF 5126 may be communicatively coupled to the application server 5130 via the P-GW 5123. The application server 5130 may signal the PCRF 5126 to indicate a new service flow and select the appropriate QoS and charging parameters. The PCRF 5126 may provision this rule into a PCEF (not shown) with the appropriate TFT and QCI, which commences the QoS and charging as specified by the application server 5130. The Gx reference point between the PCRF 5126 and the P-GW 5123 may allow for the transfer of QoS policy and charging rules from the PCRF 5126 to PCEF in the P-GW 5123. An Rx reference point may reside between the PDN 5130 (or "AF 5130") and the PCRF 5126.

Figure 5B:
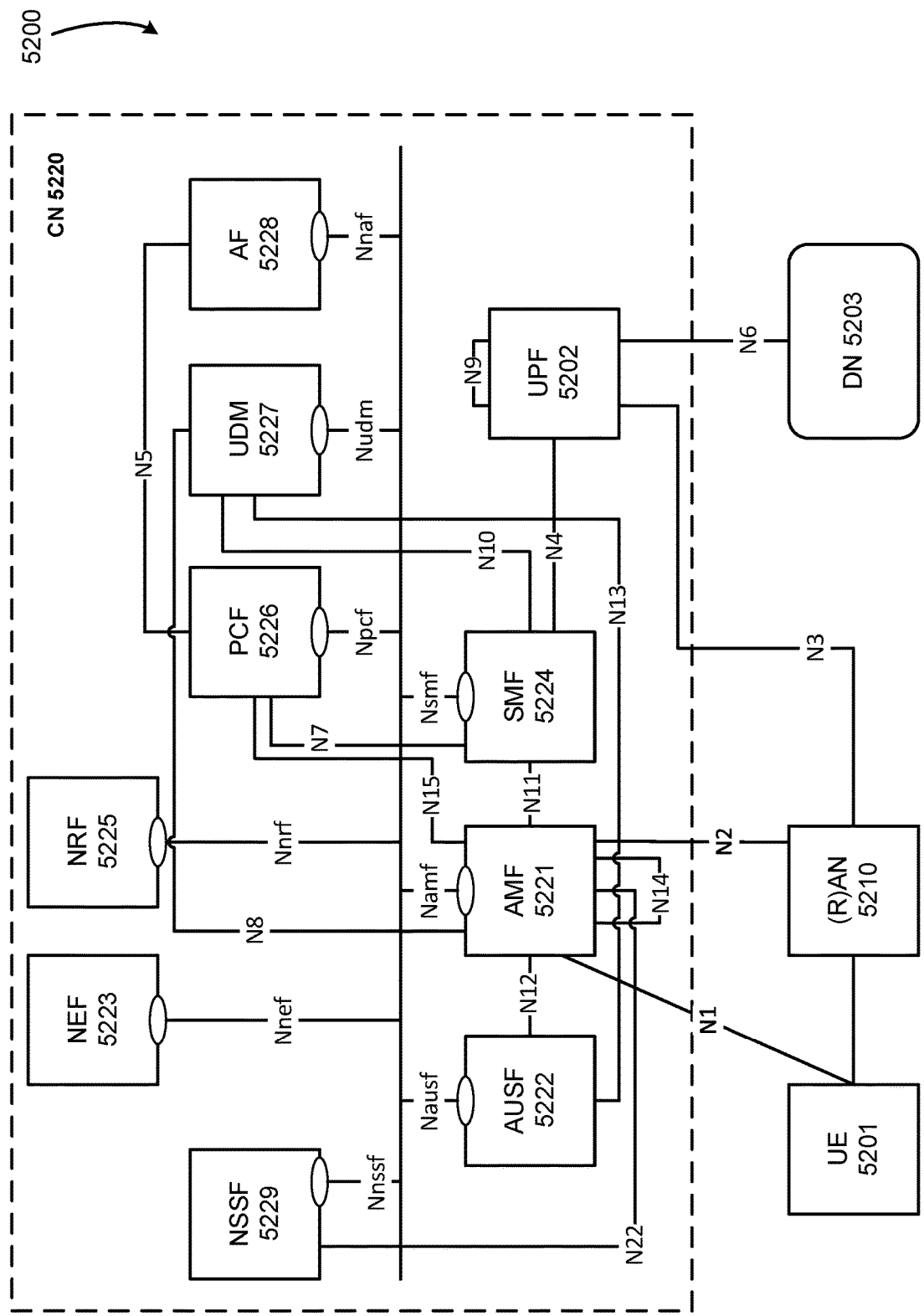
FIG. 5B depicts an architecture of a system including a second core network in accordance with some embodiments.

FIG. 5B illustrates an architecture of a system 5200 including a second CN 5220 in accordance with various embodiments. The system 5200 is shown to include a UE 5201, which may be the same or similar to the UEs 401 and UE 5101 discussed previously; a (R)AN 5210, which may be the same or similar to the RAN 410 and RAN 5110 discussed previously, and which may include RAN nodes 411 discussed previously; and a DN 5203, which may be, for example, operator services, Internet access or 3rd party services; and a 5GC 5220. The 5GC 5220 may include an AUSF 5222; an AMF 5221; a SMF 5224; a NEF 5223; a PCF 5226; a NRF 5225; a UDM 5227; an AF 5228; a UPF 5202; and a NSSF 5229.

The UPF 5202 may act as an anchor point for intra-RAT and inter-RAT mobility, an external PDU session point of interconnect to DN 5203, and a branching point to support multi-homed PDU session. The UPF 5202 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 5202 may include an uplink classifier to support routing traffic flows to a data network. The DN 5203 may represent various network operator services, Internet access, or third party services. DN 5203 may include, or be similar to, application server 430 discussed previously. The UPF 5202 may interact with the SMF 5224 via an N4 reference point between the SMF 5224 and the UPF 5202.

The AUSF 5222 may store data for authentication of UE 5201 and handle authentication-related functionality. The AUSF 5222 may facilitate a common authentication framework for various access types. The AUSF 5222 may communicate with the AMF 5221 via an N12 reference point between the AMF 5221 and the AUSF 5222; and may communicate with the UDM 5227 via an N13 reference point between the UDM 5227 and the AUSF 5222. Additionally, the AUSF 5222 may exhibit an Nausf service-based interface.

The AMF 5221 may be responsible for registration management (e.g., for registering UE 5201, etc.), connection management, reachability management, mobility management, and lawful interception of AMF-related events, and access authentication and authorization. The AMF 5221 may be a termination point for the an N11 reference point between the AMF 5221 and the SMF 5224. The AMF 5221 may provide transport for SM messages between the UE 5201 and the SMF 5224, and act as a transparent proxy for routing SM messages. AMF 5221 may also provide transport for SMS messages between UE 5201 and an SMSF (not shown by FIG. 5B). AMF 5221 may act as SEAF, which may include interaction with the AUSF 5222 and the UE 5201, receipt of an intermediate key that was established as a result of the UE 5201 authentication process. Where USIM based authentication is used, the AMF 5221 may retrieve the security material from the AUSF 5222. AMF 5221 may also include a SCM function, which receives a key from the SEA that it uses to derive access-network specific keys. Furthermore, AMF 5221 may be a termination point of a RAN CP interface, which may include or be an N2 reference point between the (R)AN 5210 and the AMF 5221; and the AMF 5221 may be a termination point of NAS (N1) signaling, and perform NAS ciphering and integrity protection.

AMF 5221 may also support NAS signaling with a UE 5201 over an N3 IWF interface. The N3IWF may be used to provide access to untrusted entities. N3IWF may be a termination point for the N2 interface between the (R)AN 5210 and the AMF 5221 for the control plane, and may be a termination point for the N3 reference point between the (R)AN 5210 and the UPF 5202 for the user plane. As such, the AMF 5221 may handle N2 signaling from the SMF 5224 and the AMF 5221 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signaling between the UE 5201 and AMF 5221 via an N1 reference point between the UE 5201 and the AMF 5221, and relay uplink and downlink user-plane packets between the UE 5201 and UPF 5202. The N3IWF also provides mechanisms for IPsec tunnel establishment with the UE 5201. The AMF 5221 may exhibit an Namf service-based interface, and may be a termination point for an N14 reference point between two AMFs 5221 and an N17 reference point between the AMF 5221 and a 5G-EIR (not shown by FIG. 5B).

The UE 5201 may need to register with the AMF 5221 in order to receive network services. RM is used to register or deregister the UE 5201 with the network (e.g., AMF 5221), and establish a UE context in the network (e.g., AMF 5221). The UE 5201 may operate in an RM-REGISTERED state or an RM-DEREGISTERED state. In the RM-DEREGISTERED state, the UE 5201 is not registered with the network, and the UE context in AMF 5221 holds no valid location or routing information for the UE 5201 so the UE 5201 is not reachable by the AMF 5221. In the RM-REGISTERED state, the UE 5201 is registered with the network, and the UE context in AMF 5221 may hold a valid location or routing information for the UE 5201 so the UE 5201 is reachable by the AMF 5221. In the RM-REGISTERED state, the UE 5201 may perform mobility Registration Update procedures, perform periodic Registration Update procedures triggered by expiration of the periodic update timer (e.g., to notify the network that the UE 5201 is still active), and perform a Registration Update procedure to update UE capability information or to re-negotiate protocol parameters with the network, among others.

The AMF 5221 may store one or more RM contexts for the UE 5201, where each RM context is associated with a specific access to the network. The RM context may be a data structure, database object, etc. that indicates or stores, inter alia, a registration state per access type and the periodic update timer. The AMF 5221 may also store a 5GC MM context that may be the same or similar to the (E)MM context discussed previously. In various embodiments, the AMF 5221 may store a CE mode B Restriction parameter of the UE 5201 in an associated MM context or RM context. The AMF 5221 may also derive the value, when needed, from the UE's usage setting parameter already stored in the UE context (and/or MM/RM context).

CM may be used to establish and release a signaling connection between the UE 5201 and the AMF 5221 over the N1 interface. The signaling connection is used to enable NAS signaling exchange between the UE 5201 and the CN 5220, and comprises both the signaling connection between the UE and the AN (e.g., RRC connection or UE-N3IWF connection for non-3GPP access) and the N2 connection for the UE 5201 between the AN (e.g., RAN 5210) and the AMF 5221. The UE 5201 may operate in one of two CM states, CM-IDLE mode or CM-CONNECTED mode. When the UE 5201 is operating in the CM-IDLE state/mode, the UE 5201 may have no NAS signaling connection established with the AMF 5221 over the N1 interface, and there may be (R)AN 5210 signaling connection (e.g., N2 and/or N3 connections) for the UE 5201. When the UE 5201 is operating in the CM-CONNECTED state/mode, the UE 5201 may have an established NAS signaling connection with the AMF 5221 over the N1 interface, and there may be a (R)AN 5210 signaling connection (e.g., N2 and/or N3 connections) for the UE 5201. Establishment of an N2 connection between the (R)AN 5210 and the AMF 5221 may cause the UE 5201 to transition from CM-IDLE mode to CM-CONNECTED mode, and the UE 5201 may transition from the CM-CONNECTED mode to the CM-IDLE mode when N2 signaling between the (R)AN 5210 and the AMF 5221 is released.

The SMF 5224 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 5201 and a data network (DN) 5203 identified by a Data Network Name (DNN). PDU sessions may be established upon UE 5201 request, modified upon UE 5201 and 5GC 5220 request, and released upon UE 5201 and 5GC 5220 request using NAS SM signaling exchanged over the N1 reference point between the UE 5201 and the SMF 5224. Upon request from an application server, the 5GC 5220 may trigger a specific application in the UE 5201. In response to receipt of the trigger message, the UE 5201 may pass the trigger message (or relevant parts/information of the trigger message) to one or more identified applications in the UE 5201. The identified application(s) in the UE 5201 may establish a PDU session to a specific DNN. The SMF 5224 may check whether the UE 5201 requests are compliant with user subscription information associated with the UE 5201. In this regard, the SMF 5224 may retrieve and/or request to receive update notifications on SMF 5224 level subscription data from the UDM 5227.

The SMF 5224 may include the following roaming functionality handling local enforcement to apply QoS SLAB (VPLMN); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 5224 may be included in the system 5200, which may be between another SMF 5224 in a visited network and the SMF 5224 in the home network in roaming scenarios. Additionally, the SMF 5224 may exhibit the Nsmf service-based interface.

The NEF 5223 may provide means for securely exposing the services and capabilities provided by 3GPP network functions for third party, internal exposure/re-exposure, Application Functions (e.g., AF 5228), edge computing or fog computing systems, etc. In such embodiments, the NEF 5223 may authenticate, authorize, and/or throttle the AFs. NEF 5223 may also translate information exchanged with the AF 5228 and information exchanged with internal network functions. For example, the NEF 5223 may translate between an AF-Service-Identifier and an internal 5GC information. NEF 5223 may also receive information from other network functions (NFs) based on exposed capabilities of other network functions. This information may be stored at the NEF 5223 as structured data, or at a data storage NF using standardized interfaces. The stored information can then be re-exposed by the NEF 5223 to other NFs and AFs, and/or used for other purposes such as analytics. Additionally, the NEF 5223 may exhibit an Nnef service-based interface.

The NRF 5225 may support service discovery functions, receive NF discovery requests from NF instances, and provide the information of the discovered NF instances to the NF instances. NRF 5225 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 5225 may exhibit the Nnrf service-based interface.

The PCF 5226 may provide policy rules to control plane function(s) to enforce them, and may also support unified policy framework to govern network behaviour. The PCF 5226 may also implement an FE to access subscription information relevant for policy decisions in a UDR of the UDM 5227. The PCF 5226 may communicate with the AMF 5221 via an N15 reference point between the PCF 5226 and the AMF 5221, which may include a PCF 5226 in a visited network and the AMF 5221 in case of roaming scenarios. The PCF 5226 may communicate with the AF 5228 via an N5 reference point between the PCF 5226 and the AF 5228; and with the SMF 5224 via an N7 reference point between the PCF 5226 and the SMF 5224. The system 5200 and/or CN 5220 may also include an N24 reference point between the PCF 5226 (in the home network) and a PCF 5226 in a visited network. Additionally, the PCF 5226 may exhibit an Npcf service-based interface.

The UDM 5227 may handle subscription-related information to support the network entities' handling of communication sessions, and may store subscription data of UE 5201. For example, subscription data may be communicated between the UDM 5227 and the AMF 5221 via an N8 reference point between the UDM 5227 and the AMF. The UDM 5227 may include two parts, an application FE and a UDR (the FE and UDR are not shown by FIG. 5B). The UDR may store subscription data and policy data for the UDM 5227 and the PCF 5226, and/or structured data for exposure and application data (including PFDs for application detection, application request information for multiple UEs 5201) for the NEF 5223. The Nudr service-based interface may be exhibited by the UDR 221 to allow the UDM 5227, PCF 5226, and NEF 5223 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 5224 via an N10 reference point between the UDM 5227 and the SMF 5224. UDM 5227 may also support SMS management, wherein an SMS-FE implements the similar application logic as discussed previously. Additionally, the UDM 5227 may exhibit the Nudm service-based interface.

The AF 5228 may provide application influence on traffic routing, provide access to the NCE, and interact with the policy framework for policy control. The NCE may be a mechanism that allows the 5GC 5220 and AF 5228 to provide information to each other via NEF 5223, which may be used for edge computing implementations. In such implementations, the network operator and third party services may be hosted close to the UE 5201 access point of attachment to achieve an efficient service delivery through the reduced end-to-end latency and load on the transport network. For edge computing implementations, the 5GC may select a UPF 5202 close to the UE 5201 and execute traffic steering from the UPF 5202 to DN 5203 via the N6 interface. This may be based on the UE subscription data, UE location, and information provided by the AF 5228. In this way, the AF 5228 may influence UPF (re)selection and traffic routing. Based on operator deployment, when AF 5228 is considered to be a trusted entity, the network operator may permit AF 5228 to interact directly with relevant NFs. Additionally, the AF 5228 may exhibit an Naf service-based interface.

The NSSF 5229 may select a set of network slice instances serving the UE 5201. The NSSF 5229 may also determine allowed NSSAI and the mapping to the subscribed S-NSSAIs, if needed. The NSSF 5229 may also determine the AMF set to be used to serve the UE 5201, or a list of candidate AMF(s) 5221 based on a suitable configuration and possibly by querying the NRF 5225. The selection of a set of network slice instances for the UE 5201 may be triggered by the AMF 5221 with which the UE 5201 is registered by interacting with the NSSF 5229, which may lead to a change of AMF 5221. The NSSF 5229 may interact with the AMF 5221 via an N22 reference point between AMF 5221 and NSSF 5229; and may communicate with another NSSF 5229 in a visited network via an N31 reference point (not shown by FIG. 5B). Additionally, the NSSF 5229 may exhibit an Nnssf service-based interface.

As discussed previously, the CN 5220 may include an SMSF, which may be responsible for SMS subscription checking and verification, and relaying SM messages to/from the UE 5201 to/from other entities, such as an SMS-GMSC/IWMSC/SMS-router. The SMS may also interact with AMF 5221 and UDM 5227 for a notification procedure that the UE 5201 is available for SMS transfer (e.g., set a UE not reachable flag, and notifying UDM 5227 when UE 5201 is available for SMS).

The CN 120 may also include other elements that are not shown by FIG. 5B, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 5B). Individual NFs may share a UDSF for storing their respective unstructured data or individual NFs may each have their own UDSF located at or near the individual NFs. Additionally, the UDSF may exhibit an Nudsf service-based interface (not shown by FIG. 5B). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 5B for clarity. In one example, the CN 5220 may include an Nx interface, which is an inter-CN interface between the MME (e.g., MME 5121) and the AMF 5221 in order to enable interworking between CN 5220 and CN 5120. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 6A:
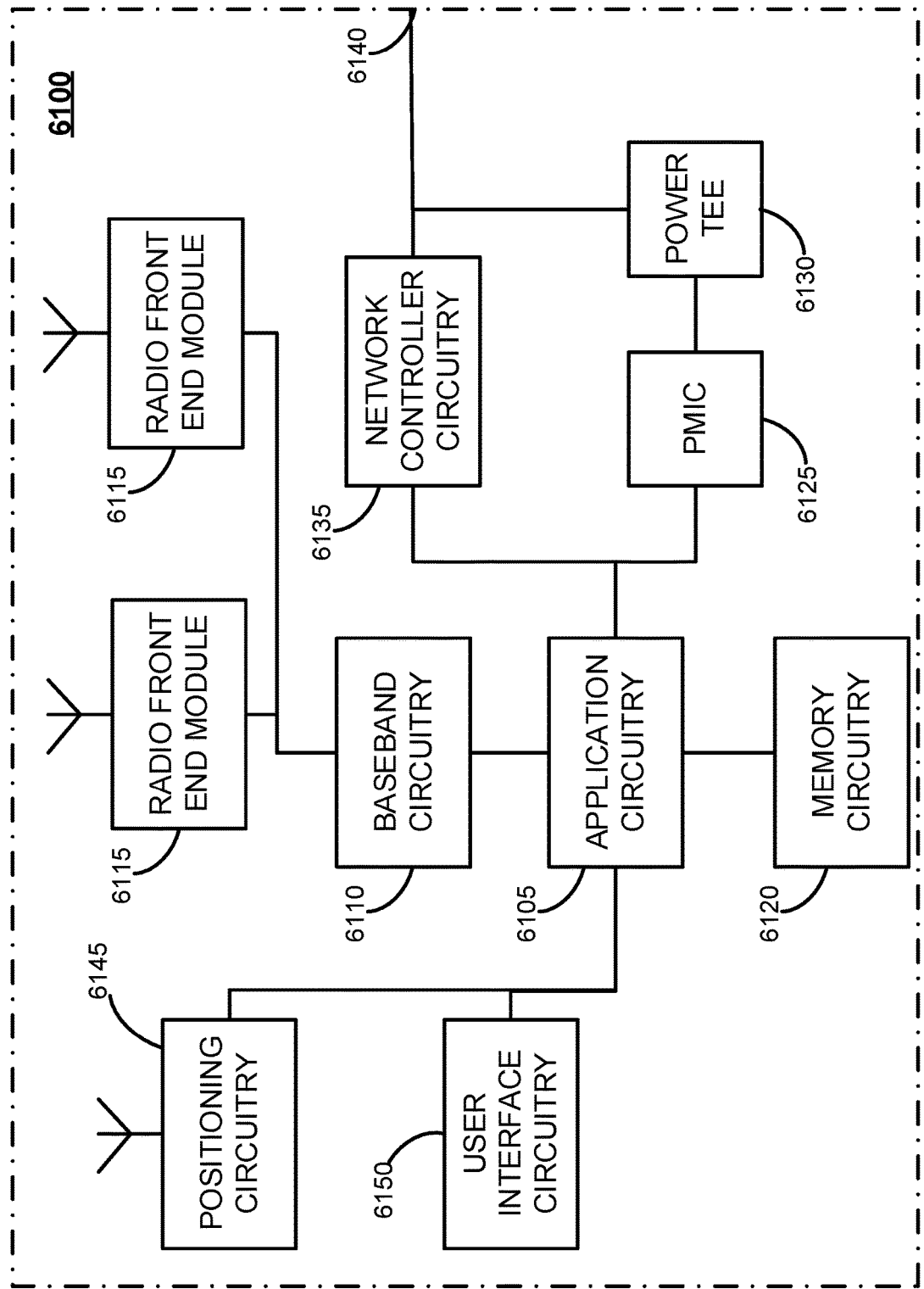
FIG. 6A depicts an example of infrastructure equipment in accordance with various embodiments.

FIG. 6A illustrates an example of infrastructure equipment 6100 in accordance with various embodiments. The infrastructure equipment 6100 (or "system 6100") may be implemented as a base station, radio head, RAN node such as the RAN nodes 411 and/or AP 406 shown and described previously, application server(s) 430, and/or any other element/device discussed herein. In other examples, the system 6100 could be implemented in or by a UE.

The system 6100 includes application circuitry 6105, baseband circuitry 6110, one or more radio front end modules (RFEMs) 6115, memory circuitry 6120, power management integrated circuitry (PMIC) 6125, power tee circuitry 6130, network controller circuitry 6135, network interface connector 6140, satellite positioning circuitry 6145, and user interface 6150. In some embodiments, the device 6100 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 6105 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 6105 may be coupled with or may include memory/ storage elements and may be configured to execute instructions stored in the memory/storage to enable various applications or operating systems to run on the system 6100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 6105 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 6105 may comprise, or may be, a special-purpose processor/controller to operate according to the various embodiments herein. As examples, the processor(s) of application circuitry 6105 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 6100 may not utilize application circuitry 6105, and instead may include a special-purpose processor/controller to process IP data received from an EPC or SGC, for example In some implementations, the application circuitry 6105 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 6105 may comprise logic blocks or logic fabric, and other interconnected resources that may be programmed to perform various functions, such as the procedures, methods, functions, etc. of the various embodiments discussed herein. In such embodiments, the circuitry of application circuitry 6105 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 6110 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 6110 are discussed infra with regard to FIG. 7.

User interface circuitry 6150 may include one or more user interfaces designed to enable user interaction with the system 6100 or peripheral component interfaces designed to enable peripheral component interaction with the system 6100. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 6115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 711 of FIG. 7 infra), and the RFEM may be connected to multiple antennas. In alternative implementations, both mmWave and sub-mmWave radio functions may be implemented in the same physical RFEM 6115, which incorporates both mmWave antennas and sub-mmWave.

The memory circuitry 6120 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 6120 may be implemented as one or more of solder down packaged integrated circuits, socketed memory modules and plug-in memory cards.

The PMIC 6125 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 6130 may provide for electrical power drawn from a network cable to provide both power supply and data connectivity to the infrastructure equipment 6100 using a single cable.

The network controller circuitry 6135 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 6100 via network interface connector 6140 using a physical connection, which may be electrical (commonly referred to as a "copper interconnect"), optical, or wireless. The network controller circuitry 6135 may include one or more dedicated processors and/or FPGAs to communicate using one or more of the aforementioned protocols. In some implementations, the network controller circuitry 6135 may include multiple controllers to provide connectivity to other networks using the same or different protocols.

The positioning circuitry 6145 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 6145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 6145 may include a Micro-Technology for Positioning, Navigation, and Timing (Micro-PNT) IC that uses a master timing clock to perform position tracking/estimation without GNSS assistance. The positioning circuitry 6145 may also be part of, or interact with, the baseband circuitry 6110 and/or RFEMs 6115 to communicate with the nodes and components of the positioning network. The positioning circuitry 6145 may also provide position data and/or time data to the application circuitry 6105, which may use the data to synchronize operations with various infrastructure (e.g., RAN nodes 411, etc.), or the like.

The components shown by FIG. 6A may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I²C interface, an SPI interface, point to point interfaces, and a power bus, among others.

Figure 6B:
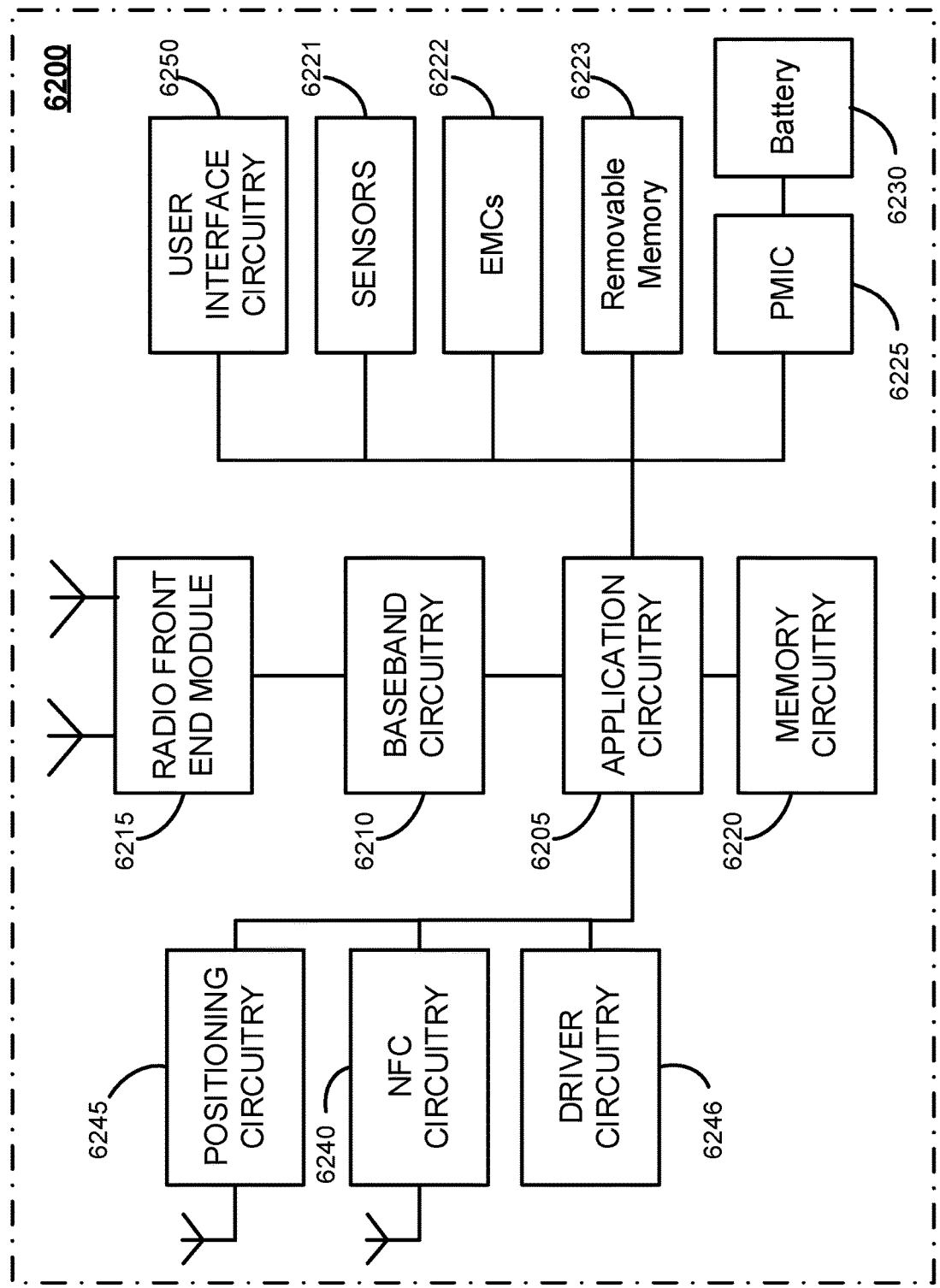
FIG. 6B depicts example components of a computer platform in accordance with various embodiments

FIG. 6B illustrates an example of a platform 6200 (or "device 6200") in accordance with various embodiments. In embodiments, the computer platform 6200 may be suitable for use as UEs 401, 5101, 5201, application servers 430, and/or any other element/device discussed herein. The platform 6200 may include any combinations of the components shown in the example. The components of platform 6200 may be implemented as integrated circuits (ICs), portions thereof, discrete electronic devices, or other modules, logic, hardware, software, firmware, or a combination thereof adapted in the computer platform 6200, or as components otherwise incorporated within a chassis of a larger system. The block diagram of FIG. 6B is intended to show a high level view of components of the computer platform 6200. However, some of the components shown may be omitted, additional components may be present, and different arrangement of the components shown may occur in other implementations.

Application circuitry 6205 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 6205 may be coupled with or may include memory/storage elements and may be configured to execute instructions stored in the memory/storage to enable various applications or operating systems to run on the system 6200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 6105 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 6105 may comprise, or may be, a special-purpose processor/controller to operate according to the various embodiments herein.

As examples, the processor(s) of application circuitry 6205 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 6205 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 6205 may be a part of a system on a chip (SoC) in which the application circuitry 6205 and other components are formed into a single integrated circuit, or a single package, such as the Edison™ or Galileo™ SoC boards from Intel® Corporation.

Additionally or alternatively, application circuitry 6205 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 6205 may comprise logic blocks or logic fabric, and other interconnected resources that may be programmed to perform various functions, such as the procedures, methods, functions, etc. of the various embodiments discussed herein. In such embodiments, the circuitry of application circuitry 6205 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 6210 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 6210 are discussed infra with regard to FIG. 7.

The RFEMs 6215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 711 of FIG. 7 infra), and the RFEM may be connected to multiple antennas. In alternative implementations, both mmWave and sub-mmWave radio functions may be implemented in the same physical RFEM 6215, which incorporates both mmWave antennas and sub-mmWave.

The memory circuitry 6220 may include any number and type of memory devices used to provide for a given amount of system memory. As examples, the memory circuitry 6220 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 6220 may be developed in accordance with a Joint Electron Devices Engineering Council (JEDEC) low power double data rate (LPDDR)-based design, such as LPDDR2, LPDDR3, LPDDR4, or the like. Memory circuitry 6220 may be implemented as one or more of solder down packaged integrated circuits, single die package (SDP), dual die package (DDP) or quad die package (Q17P), socketed memory modules, dual inline memory modules (DIMMs) including microDlMMs or MiniDIMMs, and/or soldered onto a motherboard via a ball grid array (BGA). In low power implementations, the memory circuitry 6220 may be on-die memory or registers associated with the application circuitry 6205. To provide for persistent storage of information such as data, applications, operating systems and so forth, memory circuitry 6220 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 6200 may incorporate the three-dimensional (3D) cross-point (XPOINT) memories from Intel® and Micron®.

Removable memory circuitry 6223 may include devices, circuitry, enclosures/housings, ports or receptacles, etc. used to couple portable data storage devices with the platform 6200. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 6200 may also include interface circuitry (not shown) that is used to connect external devices with the platform 6200. The external devices connected to the platform 6200 via the interface circuitry include sensor circuitry 6221 and electro-mechanical components (EMCs) 6222, as well as removable memory devices coupled to removable memory circuitry 6223.

The sensor circuitry 6221 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 6222 include devices, modules, or subsystems whose purpose is to enable platform 6200 to change its state, position, and/or orientation, or move or control a mechanism or (sub)system. Additionally, EMCs 6222 may be configured to generate and send messages/signaling to other components of the platform 6200 to indicate a current state of the EMCs 6222. Examples of the EMCs 6222 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 6200 is configured to operate one or more EMCs 6222 based on one or more captured events and/or instructions or control signals received from a service provider and/or various clients.

In some implementations, the interface circuitry may connect the platform 6200 with positioning circuitry 6245. The positioning circuitry 6245 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 6245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 6245 may include a Micro-PNT IC that uses a master timing clock to perform position tracking/estimation without GNSS assistance. The positioning circuitry 6245 may also be part of, or interact with, the baseband circuitry 6110 and/or RFEMs 6215 to communicate with the nodes and components of the positioning network. The positioning circuitry 6245 may also provide position data and/or time data to the application circuitry 6205, which may use the data to synchronize operations with various infrastructure (e.g., radio base stations), for turn-by-turn navigation applications, or the like In some implementations, the interface circuitry may connect the platform 6200 with Near-Field Communication (NFC) circuitry 6240. NFC circuitry 6240 is configured to provide contactless, short-range communications based on radio frequency identification (RFID) standards, wherein magnetic field induction is used to enable communication between NFC circuitry 6240 and NFC-enabled devices external to the platform 6200 (e.g., an "NFC touchpoint"). NFC circuitry 6240 comprises an NFC controller coupled with an antenna element and a processor coupled with the NFC controller. The NFC controller may be a chip/IC providing NFC functionalities to the NFC circuitry 6240 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 6240, or initiate data transfer between the NFC circuitry 6240 and another active NFC device (e.g., a smartphone or an NFC-enabled POS terminal) that is proximate to the platform 6200.

The driver circuitry 6246 may include software and hardware elements that operate to control particular devices that are embedded in the platform 6200, attached to the platform 6200, or otherwise communicatively coupled with the platform 6200. The driver circuitry 6246 may include individual drivers allowing other components of the platform 6200 to interact with or control various input/output (I/O) devices that may be present within, or connected to, the platform 6200. For example, driver circuitry 6246 may include a display driver to control and allow access to a display device, a touchscreen driver to control and allow access to a touchscreen interface of the platform 6200, sensor drivers to obtain sensor readings of sensor circuitry 6221 and control and allow access to sensor circuitry 6221, EMC drivers to obtain actuator positions of the EMCs 6222 and/or control and allow access to the EMCs 6222, a camera driver to control and allow access to an embedded image capture device, audio drivers to control and allow access to one or more audio devices.

The power management integrated circuitry (PMIC) 6225 (also referred to as "power management circuitry 6225") may manage power provided to various components of the platform 6200. In particular, with respect to the baseband circuitry 6210, the PMIC 6225 may control power-source selection, voltage scaling, battery charging, or DC-to-DC conversion. The PMIC 6225 may often be included when the platform 6200 is capable of being powered by a battery 6230, for example, when the device is included in a UE 401, 5101, 5201.

In some embodiments, the PMIC 6225 may control, or otherwise be part of, various power saving mechanisms of the platform 6200. For example, if the platform 6200 is in an RRC_Connected state, where it is still connected to the RAN node as it expects to receive traffic shortly, then it may enter a state known as Discontinuous Reception Mode (DRX) after a period of inactivity. During this state, the platform 6200 may power down for brief intervals of time and thus save power. If there is no data traffic activity for an extended period of time, then the platform 6200 may transition off to an RRC_Idle state, where it disconnects from the network and does not perform operations such as channel quality feedback, handover, etc. The platform 6200 goes into a very low power state and it performs paging where again it periodically wakes up to listen to the network and then powers down again. The platform 6200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 6230 may power the platform 6200, although in some examples the platform 6200 may be mounted deployed in a fixed location, and may have a power supply coupled to an electrical grid. The battery 6230 may be a lithium ion battery, a metal-air battery, such as a zinc-air battery, an aluminum-air battery, a lithium-air battery, and the like. In some implementations, such as in V2X applications, the battery 6230 may be a typical lead-acid automotive battery.

In some implementations, the battery 6230 may be a "smart battery," which includes or is coupled with a Battery Management System (BMS) or battery monitoring integrated circuitry. The BMS may be included in the platform 6200 to track the state of charge (SoCh) of the battery 6230. The BMS may be used to monitor other parameters of the battery 6230 to provide failure predictions, such as the state of health (SoH) and the state of function (SoF) of the battery 6230. The BMS may communicate the information of the battery 6230 to the application circuitry 6205 or other components of the platform 6200. The BMS may also include an analog-to-digital (ADC) convertor that allows the application circuitry 6205 to directly monitor the voltage of the battery 6230 or the current flow from the battery 6230. The battery parameters may be used to determine actions that the platform 6200 may perform, such as transmission frequency, network operation, sensing frequency, and the like.

A power block, or other power supply coupled to an electrical grid may be coupled with the BMS to charge the battery 6230. In some examples, the power block 630 may be replaced with a wireless power receiver to obtain the power wirelessly, for example, through a loop antenna in the computer platform 6200. In these examples, a wireless battery charging circuit may be included in the BMS. The specific charging circuits chosen may depend on the size of the battery 6230, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 6250 includes various input/output (I/O) devices present within, or connected to, the platform 6200, and includes one or more user interfaces designed to enable user interaction with the platform 6200 and/or peripheral component interfaces designed to enable peripheral component interaction with the platform 6200. The user interface circuitry 6250 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 6200. The output device circuitry may also include speakers or other audio emitting devices, printer(s), and/or the like. In some embodiments, the sensor circuitry 6221 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 6200 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an $I^2C$ interface, an SPI interface, point-to-point interfaces, and a power bus, among others.

Figure 7:
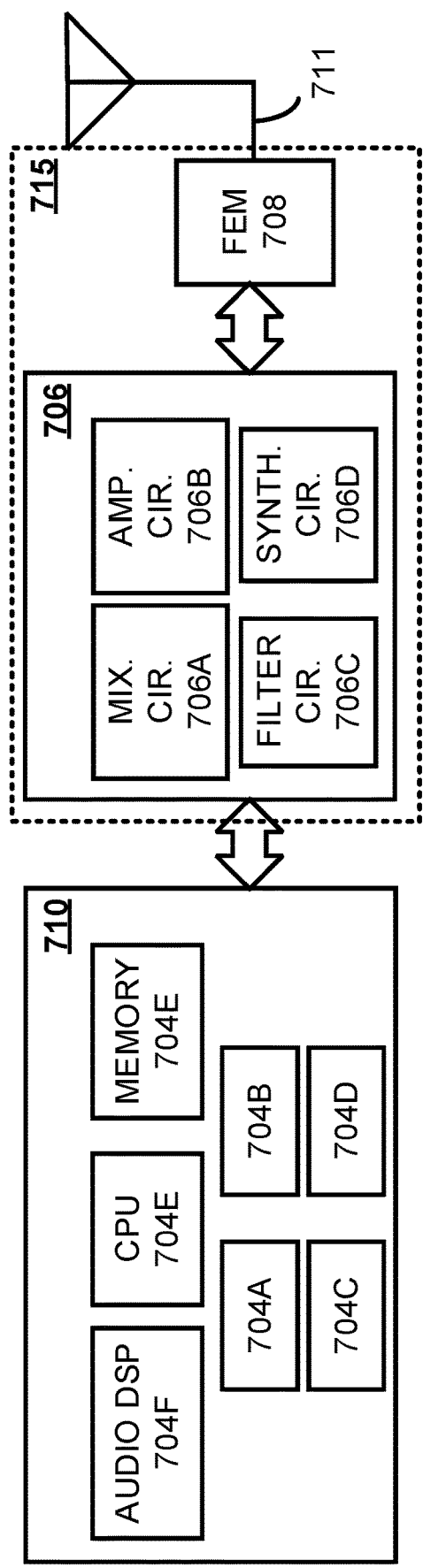
FIG. 7 depicts example components of baseband circuitry and radio frequency circuitry in accordance with various embodiments.

FIG. 7 illustrates example components of baseband circuitry 710 and radio front end modules (RFEM) 715 in accordance with various embodiments. The baseband circuitry 710 corresponds to the baseband circuitry 6110 and 6210 of FIGS. 6A and 6B, respectively. The RFEM 715 corresponds to the RFEM 6115 and 6215 of FIGS. 6A and 6B, respectively. As shown, the RFEMs 715 may include Radio Frequency (RF) circuitry 706, front-end module (FEM) circuitry 708, antenna array 711 coupled together at least as shown.

The baseband circuitry 710 includes circuitry and/or control logic configured to carry out various radio/network protocol and radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 710 may include Fast-Fourier Transform (FFT), precoding, or constellation mapping/demapping functionality. In some embodiments, encoding/decoding circuitry of the baseband circuitry 710 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 710 is configured to process baseband signals received from a receive signal path of the RF circuitry 706 and to generate baseband signals for a transmit signal path of the RF circuitry 706. The baseband circuitry 710 is configured to interface with application circuitry 6105/6205 (see FIGS. 6A and 6B) for generation and processing of the baseband signals and for controlling operations of the RF circuitry 706. The baseband circuitry 710 may handle various radio control functions.

The aforementioned circuitry and/or control logic of the baseband circuitry 710 may include one or more single or multi-core processors. For example, the one or more processors may include a 3G baseband processor 704A, a 4G/LTE baseband processor 704B, a 5G/NR baseband processor 704C, or some other baseband processor(s) 704D for other existing generations, generations in development or to be developed in the future (e.g., sixth generation (6G), etc.). In other embodiments, some or all of the functionality of baseband processors 704A-D may be included in modules stored in the memory 704G and executed via a Central Processing Unit (CPU) 704E. In other embodiments, some or all of the functionality of baseband processors 704A-D may be provided as hardware accelerators (e.g., FPGAs, ASICs, etc.) loaded with the appropriate bit streams or logic blocks stored in respective memory cells. In various embodiments, the memory 704G may store program code of a real-time OS (RTOS), which when executed by the CPU 704E (or other baseband processor), is to cause the CPU 704E (or other baseband processor) to manage resources of the baseband circuitry 710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 710 includes one or more audio digital signal processor(s) (DSP) 704F. The audio DSP(s) 704F include elements for compression/decompression and echo cancellation and may include other suitable processing elements in other embodiments.

In some embodiments, each of the processors 704A-704E include respective memory interfaces to send/receive data to/from the memory 704G. The baseband circuitry 710 may further include one or more interfaces to communicatively couple to other circuitries/devices, such as an interface to send/receive data to/from memory external to the baseband circuitry 710; an application circuitry interface to send/receive data to/from the application circuitry 6105/6205 of FIGS. 6A-7); an RF circuitry interface to send/receive data to/from RF circuitry 706 of FIG. 7; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 6225.

In alternate embodiments (which may be combined with the above described embodiments), baseband circuitry 710 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (e.g., the radio front end modules 715).

Although not shown by FIG. 7, in some embodiments, the baseband circuitry 710 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 710 and/or RF circuitry 706 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 710 and/or RF circuitry 706 are part of a Wi-Fi communication system. In the second example, the protocol processing circuitry would operate Wi-Fi MAC and logical link control (LLC) functions. The protocol processing circuitry may include one or more memory structures (e.g., 704G) to store program code and data for operating the protocol functions, as well as one or more processing cores to execute the program code and perform various operations using the data. The baseband circuitry 710 may also support radio communications for more than one wireless protocol.

The various hardware elements of the baseband circuitry 710 discussed herein may be implemented, for example, as a solder-down substrate including one or more integrated circuits (ICs), a single packaged IC soldered to a main circuit board or a multi-chip module containing two or more ICs. In one example, the components of the baseband circuitry 710 may be suitably combined in a single chip or chipset, or disposed on a same circuit board. In another example, some or all of the constituent components of the baseband circuitry 710 and RF circuitry 706 may be implemented together such as, for example, a system on a chip (SoC) or System-in-Package (SiP). In another example, some or all of the constituent components of the baseband circuitry 710 may be implemented as a separate SoC that is communicatively coupled with and RF circuitry 706 (or multiple instances of RF circuitry 706). In yet another example, some or all of the constituent components of the baseband circuitry 710 and the application circuitry 6105/6205 may be implemented together as individual SoCs mounted to a same circuit board (e.g., a "multi-chip package").

In some embodiments, the baseband circuitry 710 may provide for communication compatible with one or more radio technologies. For example, in some embodiments, the baseband circuitry 710 may support communication with an E-UTRAN or other WMAN, a WLAN, a WPAN. Embodiments in which the baseband circuitry 710 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path, which may include circuitry to down-convert RF signals received from the FEM circuitry 708 and provide baseband signals to the baseband circuitry 710. RF circuitry 706 may also include a transmit signal path, which may include circuitry to up-convert baseband signals provided by the baseband circuitry 710 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 710 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 710 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a of the transmit signal path may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 710 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 710 or the application circuitry 6105/6205 depending on the desired output frequency. In some embodiments, a divider control input (e.g., N) may be determined from a look-up table based on a channel indicated by the application circuitry 6105/6205.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path, which may include circuitry configured to operate on RF signals received from antenna array 711, amplify the received signals and provide the amplified versions of the received signals to the RF circuitry 706 for further processing. FEM circuitry 708 may also include a transmit signal path, which may include circuitry configured to amplify signals for transmission provided by the RF circuitry 706 for transmission by one or more of antenna elements of antenna array 711. In various embodiments, the amplification through the transmit or receive signal paths may be done solely in the RF circuitry 706, solely in the FEM circuitry 708, or in both the RF circuitry 706 and the FEM circuitry 708.

In some embodiments, the FEM circuitry 708 may include a TX/RX switch to switch between transmit mode and receive mode operation. The FEM circuitry 708 may include a receive signal path and a transmit signal path. The receive signal path of the FEM circuitry 708 may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission by one or more antenna elements of the antenna array 711.

The antenna array 711 comprises one or more antenna elements, each of which is configured convert electrical signals into radio waves to travel through the air and to convert received radio waves into electrical signals. For example, digital baseband signals provided by the baseband circuitry 710 is converted into analog RF signals (e.g., modulated waveform) that will be amplified and transmitted via the antenna elements of the antenna array 711 including one or more antenna elements (not shown). The antenna elements may be omnidirectional, direction, or a combination thereof. The antenna elements may be formed in a multitude of arranges as are known and/or discussed herein. The antenna array 711 may comprise microstrip antennas or printed antennas that are fabricated on the surface of one or more printed circuit boards. The antenna array 711 may be formed in as a patch of metal foil (e.g., a patch antenna) in a variety of shapes, and may be coupled with the RF circuitry 706 and/or FEM circuitry 708 using metal transmission lines or the like.

Processors of the application circuitry 6105/6205 and processors of the baseband circuitry 710 may be used to execute elements of one or more instances of a protocol stack. For example, processors of the baseband circuitry 710, alone or in combination, may be used execute Layer 3, Layer 2, or Layer 1 functionality, while processors of the application circuitry 6105/6205 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 8:
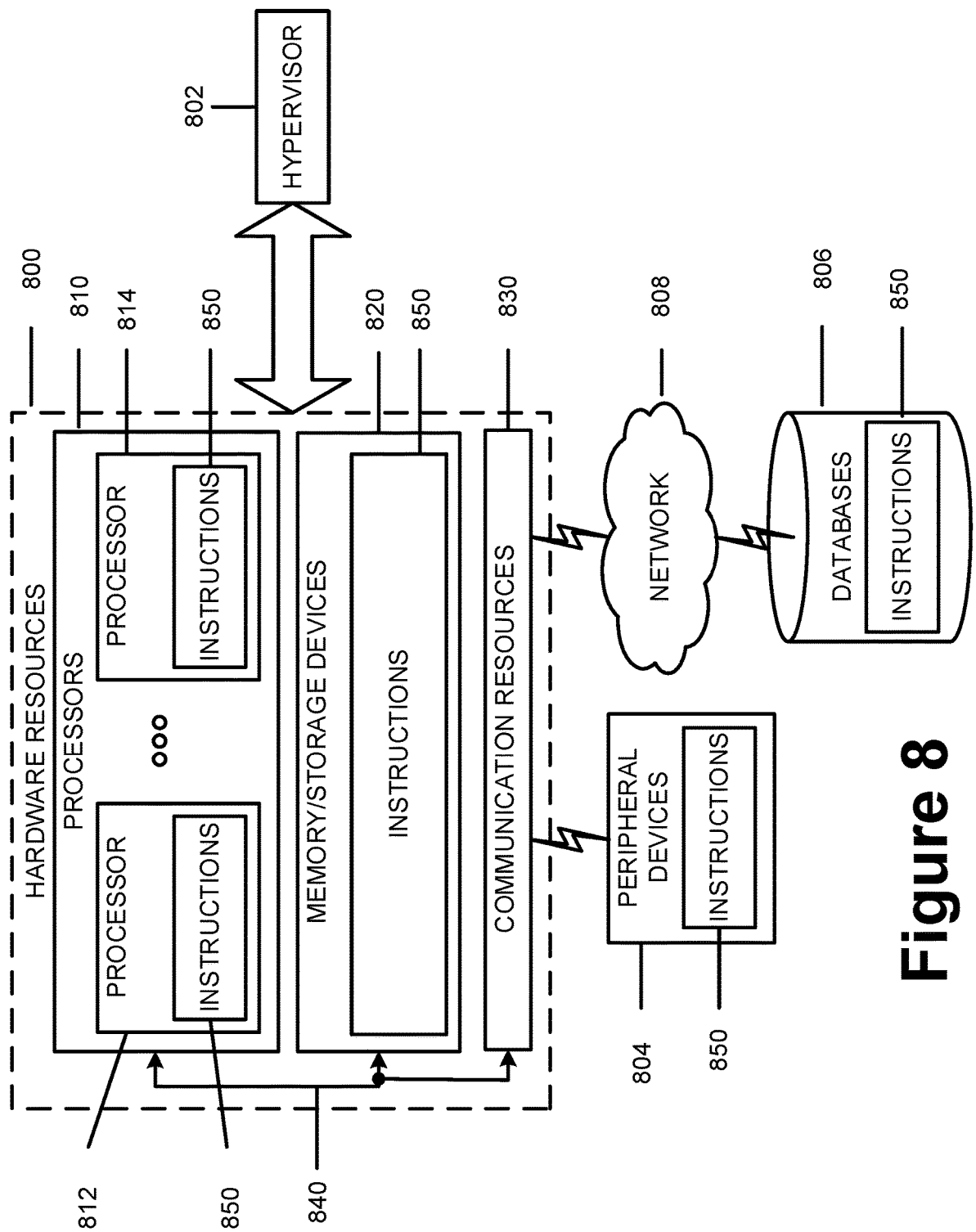
FIG. 8 depicts a block diagram illustrating components, according to some example embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 may include, for example, a processor 812 and a processor 814. The processor(s) 810 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 820 may include main memory, disk storage, or any suitable combination thereof. The memory/storage devices 820 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via USB), cellular communication components, NFC components, Bluetooth® (or Bluetooth® Low Energy) components, Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

In various embodiments, the devices/components of FIGS. 5A-8, and particularly the baseband circuitry of FIG. 7, may be used to practice, in whole or in part, any of the operation flow/algorithmic structures depicted in FIGS. 1-3.

One example of an operation flow/algorithmic structure is depicted in FIG. 1, which may be performed by an application and mobility management function (AMF) in accordance with some embodiments. In this example, operation flow/algorithmic structure 100 may include, at 105, retrieving, from memory, PC5 capability information associated with a PC5 capability for fifth generation (5G) proximity services (ProSe) for a user equipment (UE). Operation flow/algorithmic structure 100 may further include, at 110, selecting, based on the PC5 capability information, a policy control function (PCF) that supports 5G ProSe information provisioning. Operation flow/algorithmic structure 100 may further include, at 115, establishing a UE policy association with the selected PCF for 5G ProSe information provisioning delivery.

Another example of an operation flow/algorithmic structure is depicted in FIG. 2, which may be performed by an AMF in accordance with some embodiments. In this example, operation flow/algorithmic structure 200 may include, at 205, receiving a registration request message from a user equipment (UE) that includes PC5 capability information associated with a PC5 capability for fifth generation (5G) proximity services (ProSe) for the UE. Operation flow/algorithmic structure 200 may further include, at 210, selecting, based on the PC5 capability information, a policy control function (PCF) that supports 5G ProSe information provisioning. Operation flow/algorithmic structure 200 may further include, at 215, establishing a UE policy association with the selected PCF for 5G ProSe information provisioning delivery.

Another example of an operation flow/algorithmic structure is depicted in FIG. 3, which may be performed by a policy control function (PCF) in accordance with some embodiments. In this example, operation flow/algorithmic structure 300 may include, at 305, receiving, from an application and mobility management function (AMF), information associated with a PC5 capability for fifth generation (5G) proximity services (ProSe) for a user equipment (UE). Operation flow/algorithmic structure 300 may further include, at 310, determining, based on the PC5 capability information, to provision a 5G ProSe policy and parameter. Operation flow/algorithmic structure 300 may further include, at 315, encoding a message for transmission to the UE that includes an indication of the 5G ProSe policy and parameter.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include the UE indicates its PC5 Capability for ProSe to AMF in Registration Request message.

Example 2 may include the method of example 1 or some other example herein, wherein the AMF determines whether the UE is authorized to use ProSe service by checking the UE subscription information received from UDM.

Example 3 may include the method of example 2 or some other example herein, wherein if the UE is authorized for ProSe service, the AMF further reports the UE's PC5 Capability for ProSe to PCF which is capable of 5G ProSe Policy and parameter provisioning.

Example 4 may include the method of example 3 or some other example herein, wherein the PCF determines whether to provision the ProSe Policy and parameter for ProSe Direct Discovery and ProSe Direct Communication to UE based on the UE's PC5 Capability for ProSe.

Example 5 may include the method of example 4 or some other example herein, wherein the ProSe Policy and parameter for ProSe Direct Discovery includes Authorisation policy when the UE is "served by E-UTRA" or "served by NR", Authorisation policy when the UE is "not served by E-UTRA" and "not served by NR", Radio parameters for when the UE is "not served by E-UTRA" and "not served by NR", ProSe Direct Discovery UE ID, Group Member Discovery parameters.

Example 6 may include the method of example 5 or some other example herein, wherein the Authorization policy when the UE is "served by E-UTRA" or "served by NR" includes:

For open ProSe Direct Discovery, applicable only to non-Public Safety UEs:

a) open ProSe Direct Discovery Model A monitoring authorisation policy:

PLMNs in which the UE is authorised to perform ProSe Direct Discovery monitoring.

b) open ProSe Direct Discovery Model A announcing authorisation policy:

PLMNs in which the UE is authorized to perform announcing.

Authorised discovery range for announcing per PLMN.

For restricted ProSe Direct Discovery:

a) restricted ProSe Direct Discovery Model A monitoring authorisation policy:

PLMNs in which the UE is authorised to perform restricted ProSe Direct Discovery Model A monitoring.

b) restricted ProSe Direct Discovery Model A announcing authorisation policy:
  PLMNs in which the UE is authorized to perform restricted ProSe Direct Discovery Model A announcing;
  Authorised discovery range for announcing per PLMN.
c) restricted ProSe Direct Discovery Model B Discoverer operation authorization policy:
  PLMNs in which the UE is authorized to perform Model B Discoverer operation;
  Authorised discovery range for announcing per PLMN.
d) restricted ProSe Direct Discovery Model B Discoveree operation authorization policy:
  PLMNs in which the UE is authorized to perform Model B Discoveree operation.
  Authorised discovery range for announcing per PLMN.
  For each above PLMN:
    RAT(s) over which the UE is authorized to perform ProSe Direct Communications over PC5 reference point.

Example 7 may include the method of example 5 or some other example herein, wherein the Authorization policy when the UE is "not served by E-UTRA" and "not served by NR" includes:
  Indicates whether the UE is authorised to perform ProSe Direct Discovery for Model A and Model B when "not served by NG-RAN".
  RAT(s) over which the UE is authorized to perform ProSe Direct Discovery over PC5 reference point.

Example 8 may include the method of example 5 or some other example herein, wherein the Group Member Discovery parameters include:
  For each discovery group that the UE belongs to include the following parameters that enable the UE to perform Group Member Discovery when provisioned in ME from PCF or configured in UICC:
  Application Layer Group ID: Identifies an application layer group that the UE belongs to.
  User Info ID: For Model A, this corresponds to the Announcer Info parameter when the UE is acting as an announcing UE. For Model B, this corresponds to the Discoverer Info in Solicitation messages and the Discoveree Info in Response messages, when the UE is acting as a discoverer or discoveree UE respectively.
  Discovery Group ID: identifier of a discovery group that the UE belongs to.

Example 9 may include the method of example 4 or some other example herein, wherein the ProSe Policy and parameter for ProSe Direct Communication includes Authorization policy for ProSe Direct Communication, Radio parameters when the UE is "not served by E-UTRA" and "not served by NR", Policy/parameters per RAT for PC5 Tx Profile selection, Policy/parameters related to privacy, Policy/parameters when NR PC5 is selected, the Validity timer indicating the expiration time of the ProSe Policy/Parameter.

Example 10 may include the method of example 9 or some other example herein, wherein the Authorization policy for ProSe Direct Communication includes:
  When the UE is "served by E-UTRA" or "served by NR":
  PLMNs in which the UE is authorized to perform 5G ProSe Direct Communications over PC5 reference point when "served by E-UTRA" or "served by NR".
  For each above PLMN:
    RAT(s) over which the UE is authorized to perform ProSe Direct Communications over PC5 reference point.
  When the UE is "not served by E-UTRA" and "not served by NR":
    Indicates whether the UE is authorized to perform ProSe Direct Communications over PC5 reference point when "not served by E-UTRA" and "not served by NR".
    RAT(s) over which the UE is authorized to perform ProSe Direct Communications over PC5 reference point.

Example 11 may include the method of example 9 or some other example herein, wherein the Radio parameters when the UE is "not served by E-UTRA" and "not served by NR" include:
  Includes the radio parameters per PC5 RAT (e.g. LTE PC5, NR PC5) with Geographical Area(s) and an indication of whether they are "operator managed" or "non-operator managed". The UE uses the radio parameters to perform ProSe Direct Communications over PC5 reference point when "not served by E-UTRA" and "not served by NR" only if the UE can reliably locate itself in the corresponding Geographical Area.

Example 12 may include the method of example 9 or some other example herein, wherein the Policy/parameters per RAT for PC5 Tx Profile selection include:
  The mapping of ProSe service to Tx Profile.

Example 13 may include the method of example 9 or some other example herein, wherein the Policy/parameters related to privacy include:
  The list of ProSe service with Geographical Area(s) that require privacy support.

Example 14 may include the method of example 9 or some other example herein, wherein the Policy/parameters when NR PC5 is selected include:
  The mapping of ProSe service to radio frequencies with Geographical Area(s).
  The mapping of Destination Layer-2 ID(s) and the ProSe service for broadcast.
  The mapping of Destination Layer-2 ID(s) and the ProSe service for groupcast.
  The mapping of default Destination Layer-2 ID(s) for initial signaling to establish unicast connection and the ProSe service.
  PC5 QoS mapping configuration:
  Input from ProSe application layer:
  ProSe service.
  (Optional) ProSe Application Requirements for the ProSe service, e.g. priority requirement, reliability requirement, delay requirement, range requirement.
  Output:
  PC5 QoS parameters defined in clause 5.4.2 of 23.287 (e.g. PQI and conditionally other parameters such as MFBR/GFBR, etc).
  SLRB configurations, e.g. the mapping of PC5 QoS profile(s) to SLRB(s), when the UE is "not served by E-UTRA" and "not served by NR".
  The PC5 QoS profile contains PC5 QoS parameters described in clause 5.4.2 of 23.287, and value for the QoS characteristics regarding Priority Level, Averaging Window, Maximum Data Burst Volume if default value is not used as defined in Table 5.4.4-1 of 23.287.

Example 15 may include a method comprising:
  providing an indicator of a PC5 capability for ProSe of a user equipment (UE) in a Registration Request message; and transmitting or causing to transmit the Registration Request message to an access and mobility management function (AMF).

Example 16 may include the method of example 15 or some other example herein, further comprising receiving a ProSe Policy and parameter for ProSe Direct Discovery and ProSe Direct Communication based on the PC5 capability for ProSe.

Example 17 may include the method of example 16 or some other example herein, wherein the ProSe Policy and parameter for ProSe Direct Discovery includes one or more of: Authorisation policy when the UE is "served by E-UTRA" or "served by NR", Authorisation policy when the UE is "not served by E-UTRA" and "not served by NR", Radio parameters for when the UE is "not served by E-UTRA" and "not served by NR", ProSe Direct Discovery UE ID, Group Member Discovery parameters.

Example 18 may include the method of example 17 or some other example herein, wherein the Authorization policy when the UE is "served by E-UTRA" or "served by NR" includes one or more of:

For open ProSe Direct Discovery, applicable only to non-Public Safety UEs:
a) open ProSe Direct Discovery Model A monitoring authorisation policy:
PLMNs in which the UE is authorised to perform ProSe Direct Discovery monitoring.
b) open ProSe Direct Discovery Model A announcing authorisation policy:
PLMNs in which the UE is authorized to perform announcing.
Authorised discovery range for announcing per PLMN.
For restricted ProSe Direct Discovery:
a) restricted ProSe Direct Discovery Model A monitoring authorisation policy:
PLMNs in which the UE is authorised to perform restricted ProSe Direct Discovery Model A monitoring.
b) restricted ProSe Direct Discovery Model A announcing authorisation policy:
PLMNs in which the UE is authorized to perform restricted ProSe Direct Discovery Model A announcing;
Authorised discovery range for announcing per PLMN.
c) restricted ProSe Direct Discovery Model B Discoverer operation authorization policy:
PLMNs in which the UE is authorized to perform Model B Discoverer operation;
Authorised discovery range for announcing per PLMN.
d) restricted ProSe Direct Discovery Model B Discoveree operation authorization policy:
PLMNs in which the UE is authorized to perform Model B Discoveree operation.
Authorised discovery range for announcing per PLMN.
For each above PLMN:
RAT(s) over which the UE is authorized to perform ProSe Direct Communications over PC5 reference point.

Example 19 may include the method of example 17 or some other example herein, wherein the Authorization policy when the UE is "not served by E-UTRA" and "not served by NR" includes one or more of:
Indicates whether the UE is authorised to perform ProSe Direct Discovery for Model A and Model B when "not served by NG-RAN".
RAT(s) over which the UE is authorized to perform ProSe Direct Discovery over PC5 reference point.

Example 20 may include the method of example 17 or some other example herein, wherein the Group Member Discovery parameters include one or more of:
For each discovery group that the UE belongs to include the following parameters that enable the UE to perform Group Member Discovery when provisioned in ME from PCF or configured in UICC:

Application Layer Group ID: Identifies an application layer group that the UE belongs to.
User Info ID: For Model A, this corresponds to the Announcer Info parameter when the UE is acting as an announcing UE. For Model B, this corresponds to the Discoverer Info in Solicitation messages and the Discoveree Info in Response messages, when the UE is acting as a discoverer or discoveree UE respectively.
Discovery Group ID: identifier of a discovery group that the UE belongs to.

Example 21 may include the method of example 16 or some other example herein, wherein the ProSe Policy and parameter for ProSe Direct Communication includes one or more of: Authorization policy for ProSe Direct Communication, Radio parameters when the UE is "not served by E-UTRA" and "not served by NR", Policy/parameters per RAT for PC5 Tx Profile selection, Policy/parameters related to privacy, Policy/parameters when NR PC5 is selected, the Validity timer indicating the expiration time of the ProSe Policy/Parameter.

Example 22 may include the method of example 21 or some other example herein, wherein the Authorization policy for ProSe Direct Communication includes one or more of:
When the UE is "served by E-UTRA" or "served by NR":
PLMNs in which the UE is authorized to perform 5G ProSe Direct Communications over PC5 reference point when "served by E-UTRA" or "served by NR".
For each above PLMN:
RAT(s) over which the UE is authorized to perform ProSe Direct Communications over PC5 reference point.
When the UE is "not served by E-UTRA" and "not served by NR":
Indicates whether the UE is authorized to perform ProSe Direct Communications over PC5 reference point when "not served by E-UTRA" and "not served by NR".
RAT(s) over which the UE is authorized to perform ProSe Direct Communications over PC5 reference point.

Example 23 may include the method of example 21 or some other example herein, wherein the Radio parameters when the UE is "not served by E-UTRA" and "not served by NR" include one or more of:
Includes the radio parameters per PC5 RAT (e.g. LTE PC5, NR PC5) with Geographical Area(s) and an indication of whether they are "operator managed" or "non-operator managed". The UE uses the radio parameters to perform ProSe Direct Communications over PC5 reference point when "not served by E-UTRA" and "not served by NR" only if the UE can reliably locate itself in the corresponding Geographical Area.

Example 24 may include the method of example 21 or some other example herein, wherein the Policy/parameters per RAT for PC5 Tx Profile selection include:
The mapping of ProSe service to Tx Profile.

Example 25 may include the method of example 21 or some other example herein, wherein the Policy/parameters related to privacy include:
The list of ProSe service with Geographical Area(s) that require privacy support.

Example 26 may include the method of example 21 or some other example herein, wherein the Policy/parameters when NR PC5 is selected include one or more of:
The mapping of ProSe service to radio frequencies with Geographical Area(s).
The mapping of Destination Layer-2 ID(s) and the ProSe service for broadcast.

The mapping of Destination Layer-2 ID(s) and the ProSe service for groupcast.

The mapping of default Destination Layer-2 ID(s) for initial signaling to establish unicast connection and the ProSe service.

PC5 QoS mapping configuration:

Input from ProSe application layer:

ProSe service.

(Optional) ProSe Application Requirements for the ProSe service, e.g. priority requirement, reliability requirement, delay requirement, range requirement.

Output:

PC5 QoS parameters defined in clause 5.4.2 of 23.287 (e.g. PQI and conditionally other parameters such as MFBR/GFBR, etc).

SLRB configurations, e.g. the mapping of PC5 QoS profile(s) to SLRB(s), when the UE is "not served by E-UTRA" and "not served by NR".

The PC5 QoS profile contains PC5 QoS parameters described in clause 5.4.2 of 23.287, and value for the QoS characteristics regarding Priority Level, Averaging Window, Maximum Data Burst Volume if default value is not used as defined in Table 5.4.4-1 of 23.287.

Example 27 may include the method of example 15-26 or some other example herein, wherein the method is performed by a UE or a portion thereof.

Example 28 may include a method comprising:

receiving, from a user equipment (UE), a Registration Request message that includes an indicator of a PC5 capability for ProSe of the UE;

determining whether the UE is authorized to use ProSe service based on UE subscription information received from UDM; and if it is determined that the UE is authorized to use the ProSe service, reporting the PC5 capability for ProSe of the UE to a policy control function (PCF).

Example 29 may include the method of example 28 or some other example herein, wherein the method is performed by an access and mobility management function (AMF) or a portion thereof.

Example X1 includes an apparatus comprising: memory to store PC5 capability information associated with a PC5 capability for fifth generation (5G) proximity services (ProSe) for a user equipment (UE); and processing circuitry, coupled with the memory, to: retrieve the PC5 capability information from the memory; select, based on the PC5 capability information, a policy control function (PCF) that supports 5G ProSe information provisioning; and establish a UE policy association with the selected PCF for 5G ProSe information provisioning delivery.

Example X2 includes the apparatus of example X1 or some other example herein, wherein the PC5 capability information is received from the UE in a registration request message.

Example X3 includes the apparatus of example X2 or some other example herein, wherein the registration request message further includes a radio access technology (RAT) indication, and wherein the processing circuitry is further to report an indication of the PC5 capability for 5G ProSe with the RAT indication to the selected PCF.

Example X4 includes the apparatus of example X2 or some other example herein, wherein the registration request message includes the PC5 capability information in a 5G mobility management (5GMM) information element.

Example X5 includes the apparatus of example X1 or some other example herein, wherein the PC5 capability information includes one or both of: an indication of a long-term evolution (LTE) PC5 capability, or a new radio (NR) PC5 capability.

Example X6 includes the apparatus of any one of examples 1-5 or some other example herein, wherein the selection of the PCF is further based on a determination that the UE is authorized for 5G ProSe service.

Example X7 includes the apparatus of any one of examples 1-6 or some other example herein, wherein the PC5 capability information includes an indication of whether the UE is capable of supporting ProSe direct discovery and communication over a PC5 reference point.

Example X8 includes one or more computer-readable media storing instructions that, when executed by one or more processors, cause an application and mobility management function (AMF) to: receive a registration request message from a user equipment (UE) that includes PC5 capability information associated with a PC5 capability for fifth generation (5G) proximity services (ProSe) for the UE; select, based on the PC5 capability information, a policy control function (PCF) that supports 5G ProSe information provisioning; and establish a UE policy association with the selected PCF for 5G ProSe information provisioning delivery.

Example X9 includes the one or more computer-readable media of example X8 or some other example herein, wherein the registration request message further includes a radio access technology (RAT) indication, and wherein the media further stores instructions to cause the AMF to report an indication of the PC5 capability for 5G ProSe with the RAT indication to the selected PCF.

Example X10 includes the one or more computer-readable media of example X8 or some other example herein, wherein the registration request message includes the PC5 capability information in a 5G mobility management (5GMM) information element.

Example X11 includes the one or more computer-readable media of example X8 or some other example herein, wherein the PC5 capability information includes an indication of one or both of: a long-term evolution (LTE) PC5 capability, or a new radio (NR) PC5 capability.

Example X12 includes the one or more computer-readable media of any one of examples 8-11 or some other example here, wherein the selection of the PCF is further based on a determination that the UE is authorized for 5G ProSe service.

Example X13 includes the one or more computer-readable media of any one of examples 8-12 or some other example herein, wherein the PC5 capability information includes an indication of whether the UE is capable of supporting ProSe direct discovery and communication over a PC5 reference point.

Example X14 includes one or more computer-readable media storing instructions that, when executed by one or more processors, cause a policy control function (PCF) to: receive, from an application and mobility management function (AMF), information associated with a PC5 capability for fifth generation (5G) proximity services (ProSe) for a user equipment (UE); determine, based on the PC5 capability information, to provision a 5G ProSe policy and parameter; and encoding a message for transmission to the UE that includes an indication of the 5G ProSe policy and parameter.

Example X15 includes the one or more computer-readable media of example X14 or some other example herein, wherein the media further stores instructions to cause the PCF to update the 5G ProSe policy and parameter in response to UE mobility, a subscription change in a list of public land mobile networks (PLMNs) where the UE is authorized to perform a 5G operation, or a change of a service specific parameter.

Example X16 includes the one or more computer-readable media of example X14 or some other example herein, wherein the media further stores instructions to cause the PCF to provide a quality of service (QoS) parameter to the AMF.

Example X17 includes the one or more computer-readable media of example X14 or some other example herein, wherein the message includes an authorization policy to indicate a PLMN for which the UE is authorized to perform 5G ProSe direct communications over a PC5 reference point when the UE is served by evolved universal terrestrial radio access (E-EUTRA) or NR.

Example X18 includes the one or more computer-readable media of example X14 or some other example herein, wherein the message includes an authorization policy to indicate whether the UE is authorized to perform ProSe direct communications over a PC5 reference point when the UE is not served by evolved universal E-EUTRA or NR.

Example X19 includes the one or more computer-readable media of example X14 or some other example herein, wherein the message includes a policy or parameter per RAT for PC5 transmission (Tx) profile selection, a policy or parameter related to privacy, a policy or parameter associated with LTE PC5, a policy or parameter associated with NR PC5, or a validity timer indicating an expiration time of a ProSe policy or parameter.

Example X20 includes the one or more computer-readable media of example X14 or some other example herein, wherein the message includes: a policy or parameter associated with ProSe direct discovery, a policy or parameter associated with an authorization policy, a radio parameter, a restricted ProSe direct discovery UE identifier, or group member discovery parameter.

Example Z01 may include an apparatus comprising means to perform one or more elements of a method described in or related to any of examples 1-X20, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X20, or any other method or process described herein.

Example Z03 may include an apparatus comprising logic, modules, or circuitry to perform one or more elements of a method described in or related to any of examples 1-X20, or any other method or process described herein.

Example Z04 may include a method, technique, or process as described in or related to any of examples 1-X20, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X20, or portions thereof.

Example Z06 may include a signal as described in or related to any of examples 1-X20, or portions or parts thereof.

Example Z07 may include a signal in a wireless network as shown and described herein.

Example Z08 may include a method of communicating in a wireless network as shown and described herein.

Example Z09 may include a system for providing wireless communication as shown and described herein.

Example Z10 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus comprising:
   memory to store PC5 capability information associated with a PC5 capability for fifth generation (5G) proximity services (ProSe) for a user equipment (UE); and
   processing circuitry, coupled with the memory, to:
   retrieve the PC5 capability information from the memory;
   select, based on the PC5 capability information, a policy control function (PCF) that supports 5G ProSe information provisioning; and
   establish a UE policy association with the selected PCF for 5G ProSe information provisioning delivery, wherein the UE policy association includes an indication of one or more public land mobile networks (PLMNs) in which the UE is authorized to perform announcing, and one or more indications of an authorised discovery range for announcing for respective PLMNs of the one or more PLMNs.

2. The apparatus of claim 1, wherein the PC5 capability information is received from the UE in a registration request message, the registration request message further includes a radio access technology (RAT) indication, and the processing circuitry is further to report an indication of the PC5 capability for 5G ProSe with the RAT indication to the selected PCF.

3. The apparatus of claim 1, wherein the PC5 capability information is received from the UE in a registration request message, and the registration request message includes the PC5 capability information in a 5G mobility management (5GMM) information element.

4. The apparatus of claim 1, wherein the PC5 capability information includes one or both of: an indication of a long-term evolution (LTE) PC5 capability, or a new radio (NR) PC5 capability.

5. The apparatus of claim 1, wherein the selection of the PCF is further based on a determination that the UE is authorized for 5G ProSe service.

6. The apparatus of claim 1, wherein the PC5 capability information includes an indication of whether the UE is capable of supporting ProSe direct discovery and communication over a PC5 reference point.

7. One or more non-transitory computer-readable media storing instructions that, when executed by one or more processors, cause an application and mobility management function (AMF) to:
receive a registration request message from a user equipment (UE) that includes PC5capability information associated with a PC5 capability for fifth generation (5G) proximity services (ProSe) for the UE;
select, based on the PC5 capability information, a policy control function (PCF) that supports 5G ProSe information provisioning; and
establish a UE policy association with the selected PCF for 5G ProSe information provisioning delivery, wherein the 5G ProSe information provisioning delivery comprises Group Member Discovery parameters for one or more discovery groups that the UE belongs to.

8. The one or more non-transitory computer-readable media of claim 7, wherein the registration request message further includes a radio access technology (RAT) indication, and wherein the media further stores instructions to cause the AMF to report an indication of the PC5 capability for 5G ProSe with the RAT indication to the selected PCF.

9. The one or more non-transitory computer-readable media of claim 7, wherein the selection of the PCF is further based on a determination that the UE is authorized for 5G ProSe service.

10. The one or more non-transitory computer-readable media of claim 7, wherein the Group Member Discovery parameters comprise an Application Layer Group ID that identifies an application layer group that the UE belongs to.

11. The one or more non-transitory computer-readable media of claim 7, wherein the Group Member Discovery parameters comprise a User Info ID that corresponds to an Announcer Info parameter when the UE is acting as an announcing UE.

12. The one or more non-transitory computer-readable media of claim 7, wherein the Group Member Discovery parameters comprise a User Info ID that corresponds to Discoverer Info in Solicitation messages and Discoveree Info in Response messages, when the UE is acting as a discoverer or discoveree UE, respectively.

13. The one or more non-transitory computer-readable media of claim 7, wherein the message includes Group Member Discovery parameters comprising a Discovery Group ID which is an identifier of the one or more discovery groups that the UE belongs to.

14. One or more non-transitory computer-readable media storing instructions that, when executed by one or more processors, cause a policy control function (PCF) to:
receive, from an application and mobility management function (AMF), information associated with a PC5 capability for fifth generation (5G) proximity services (ProSe) for a user equipment (UE);
determine, based on the PC5 capability information, to provision a 5G ProSe policy and parameter; and
encode a message for transmission to the UE that includes an indication of the 5G ProSe policy and parameter, wherein the message includes an authorization policy to indicate public land mobile networks (PLMNs) in which the UE is authorized to perform announcing and an authorised discovery range for announcing for each PLMN.

15. The one or more non-transitory computer-readable media of claim 14, wherein the media further stores instructions to cause the PCF to update the 5G ProSe policy and parameter in response to UE mobility, a subscription change in a list of public land mobile networks (PLMNs) where the UE is authorized to perform a 5G operation, or a change of a service specific parameter.

16. The one or more non-transitory computer-readable media of claim 14, wherein the authorization policy indicates the UE is authorized to perform 5G ProSe direct communications over a PC5 reference point when the UE is served by evolved universal terrestrial radio access (E-EUTRA) or new radio (NR), and an authorization policy to indicate whether the UE is authorized to perform ProSe direct communications over a PC5 reference point when the UE is not served by E-EUTRA or NR.

17. The one or more non-transitory computer-readable media of claim 14, wherein the message includes at least one of: a policy or parameter per radio access technology (RAT) for PC5transmission (Tx) profile selection, a policy or parameter related to privacy, a policy or parameter associated with long-term evolution (LTE) PC5, a policy or parameter associated with new radio (NR) PC5, or a validity timer indicating an expiration time of a ProSe policy or parameter.

18. The one or more non-transitory computer-readable media of claim 14, wherein the message includes at least one of: a policy or parameter associated with ProSe direct discovery, a policy or parameter associated with an authorization policy, a radio parameter, or a group member discovery parameter.

19. The one or more non-transitory computer-readable media of claim 14, wherein the message includes an authorization policy to indicate PLMNs in which the UE is authorized to perform ProSe Direct Discovery monitoring.

20. The one or more non-transitory computer-readable media of claim 14, wherein the message includes a restricted ProSe Direct Discovery UE ID for Restricted Direct Discovery.

* * * * *

UNITED STATES PATENT AND TRADEMARK OFFICE
CERTIFICATE OF CORRECTION

PATENT NO. : 12,238,639 B2
APPLICATION NO. : 17/642911
DATED : February 25, 2025
INVENTOR(S) : Changhong Shan Page 1 of 1

It is certified that error appears in the above-identified patent and that said Letters Patent is hereby corrected as shown below:

In the Claims

Column 47
Claim 7, Line 33, currently reads "includes PC5capability information" but should read as follows: "includes PC5 capability information"

Column 48
Claim 17, Line 45, currently reads "for PC5transmission" but should read as follows: "for PC5 transmission"

Signed and Sealed this
Twenty-second Day of April, 2025

Coke Morgan Stewart
*Acting Director of the United States Patent and Trademark Office*